United States Patent
Sharman et al.

(10) Patent No.: US 12,081,770 B2
(45) Date of Patent: Sep. 3, 2024

(54) DATA ENCODING AND DECODING

(71) Applicant: Sony Group Corporation, Tokyo (JP)

(72) Inventors: Karl James Sharman, Basingstoke (GB); Stephen Mark Keating, Basingstoke (GB); Adrian Richard Browne, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 79 days.

(21) Appl. No.: 18/008,992

(22) PCT Filed: Jun. 16, 2021

(86) PCT No.: PCT/GB2021/051507
§ 371 (c)(1),
(2) Date: Dec. 8, 2022

(87) PCT Pub. No.: WO2021/255443
PCT Pub. Date: Dec. 23, 2021

(65) Prior Publication Data
US 2023/0276056 A1    Aug. 31, 2023

(30) Foreign Application Priority Data

Jun. 17, 2020 (GB) .................................. 2009255
Sep. 30, 2020 (GB) .................................. 2015486
Nov. 23, 2020 (GB) .................................. 2018387

(51) Int. Cl.
*H04N 19/146* (2014.01)
*H04N 19/103* (2014.01)
(Continued)

(52) U.S. Cl.
CPC ......... *H04N 19/146* (2014.11); *H04N 19/103* (2014.11); *H04N 19/13* (2014.11);
(Continued)

(58) Field of Classification Search
CPC .... H04N 19/146; H04N 19/103; H04N 19/13; H04N 19/12; H04N 19/176; H04N 19/18; H04N 19/14; H04N 19/196
See application file for complete search history.

(56) References Cited

U.S. PATENT DOCUMENTS

| | | |
|---|---|---|
| 2013/0188700 A1 | 7/2013 | Guo et al. |
| 2014/0286417 A1* | 9/2014 | Gamei ................ H03M 7/4018 375/240.12 |

FOREIGN PATENT DOCUMENTS

| | | |
|---|---|---|
| JP | 2020043610 A | 3/2020 |
| WO | WO-2020067167 A | 4/2020 |

OTHER PUBLICATIONS

International Search Report and Written Opinion mailed on Sep. 13, 2021, received for PCT Application PCT/GB2021/051507, filed on Jun. 16, 2021, 12 pages.
(Continued)

*Primary Examiner* — Nam D Pham
(74) *Attorney, Agent, or Firm* — XSENSUS LLP

(57) ABSTRACT

A method of encoding successive data items comprises storing history data for encoded data items, the history data indicating one or more aspects of encoding the encoded data items; encoding a given data item by a first encoding technique comprising encoding a series of zero or more data sets, each data set representing a respective range of values of the data items and selecting the series of data sets from a plurality of candidate data sets in dependence upon (i) a number of previously encoded data sets; and (ii) the history data applicable to a given property of the given data item; and encoding any remaining value of the given data item, the remaining value being an amount by which the given data item exceeds a maximum value which can be encoded by the
(Continued)

first encoding technique, by a second encoding technique different to the first encoding technique.

19 Claims, 20 Drawing Sheets

(51) Int. Cl.
    *H04N 19/12*     (2014.01)
    *H04N 19/13*     (2014.01)
    *H04N 19/176*     (2014.01)
    *H04N 19/18*     (2014.01)

(52) U.S. Cl.
    CPC ............ *H04N 19/12* (2014.11); *H04N 19/176* (2014.11); *H04N 19/18* (2014.11)

(56) References Cited

OTHER PUBLICATIONS

Sharman et al., "AHG 5 and 18: Entropy Coding Compression Efficiency for High Bit Depths", Joint Collaborative Team on Video Coding (JCT-VC) of ITU-T SG 16 WP 3 and ISO/IEC JTC 1/SC 29/WG 11, JCTVC-N0189, Jul. 25-Aug. 2, 2013, pp. 1-15.

Sze et al., "High Efficiency Video Coding (HEVC): Algorithms and Architectures", Chapter 3: Block Structures and Parallelism Features in HEVC, Integrated Circuits and Systems, DOI 10.1007/978-3-319-06895-4_3, Springer International Publishing, 2014, pp. 49-90.

Zhao et al., "CE7: Modified limitation on context coded bins for residual coding of Transform Skip mode (CE7-3.5 and CE7-3.6)", Joint Video Experts Team (JVET) of ITU-T SG 16 WP 3 and ISO/IEC JTC 1/SC 29/WG 11, JVET-O0104-v2, Jul. 3-12, 2019, pp. 1-6.

Marpe et al: "Context-Based Adaptive Binary Arithmetic Coding in the H.264/AVC Video Compression Standard", IEEE Transactions on Circuits and Systems for Video Technology, Institute of Electrical and Electronics Engineers, vol. 13, No. 7, Jul. 2003, pp. 620-636.

"Series H: Audiovisual and Multimedia Systems Infrastructure of audiovisual services—Coding of moving video", Telecommunication Standardization Sector of ITU, ITU-T H.265, Dec. 2016, pp. 1-643.

Bross et al., "Versatile Video Coding Editorial Refinements on Draft 10", Joint Video Experts Team (JVET) of ITU-T SG 16 WP 3 and ISO/IEC JTC 1/SC 29, JVET-T2001-v1, Oct. 7-16, 2020, pp. 1-511.

Adrian Browne et al., "On operation beyond 10-bit" [online], JVET-S0243 ( JVET-S0243.docx), Jun. 22-Jul. 1, 2020.

Benjamin Bross et al., "Versatile Video Coding" (Draft 9) [online], JVET-R2001-vA ( JVET-S0231-align-spec-to-SW_WD (on_top_of_JVET-R2001-vA).docx , Jun. 11, 20 , pp. 81-86, 176-179,411-416,426-433.

\* cited by examiner

TS

Non-TS

| 0 | 0 | 1 | 1 |
|---|---|---|---|
| 0 | 1 | 1 | 1 |
| 1 | 1 | 1 | 1 |
| 1 | 1 | 1 | 1 |

| 0 | 1 | 1 | 1 |
|---|---|---|---|
| 1 | 1 | 1 | 1 |
| 1 | 1 | 1 | 1 |
| 1 | 1 | 1 | 1 |

| 0 | 0 | 1 | 1 |
|---|---|---|---|
| 0 | 1 | 2 | 2 |
| 1 | 2 | 1 | 2 |
| 1 | 2 | 2 | 1 |

| 1 | 1 | 1 | 1 |
|---|---|---|---|
| 1 | 1 | 1 | 1 |
| 1 | 1 | 1 | 1 |
| 1 | 1 | 1 | 1 |

DATA ENCODING AND DECODING

CROSS-REFERENCE TO RELATED APPLICATIONS

The present application is based on PCT filing PCT/GB2021/051507, filed Jun. 16, 2021, which claims priority to GB 2009255.7, filed Jun. 17, 2020, GB 2015486.0, filed Sep. 30, 2020, and GB 2018387.7, filed Nov. 23, 2020, the entire contents of each are incorporated herein by reference.

BACKGROUND

Field

This disclosure relates to data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several systems, such as video or image data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

In some examples, the entropy encoding process can involve generating one or more "data sets" (such as a significance map, a greater than one map, a greater than two map and/or other data sets) to describe a block of coefficients, with any excess values which cannot be encoded by the significance maps alone being encoded as so-called escape values. The coding of an escape value can (in some examples) be performed by generating a first portion (for example, a unary or truncated unary coded portion such as a prefix) and a non-unary coded second portion (such as a suffix) having a length, in bits, dependent upon a second portion size value.

SUMMARY

The present disclosure addresses or mitigates problems arising from this processing.

The present disclosure provides a method of encoding successive data items, the method comprising:
  storing history data for encoded data items, the history data indicating one or more aspects of encoding the encoded data items;
  encoding a given data item by a first encoding technique, the first encoding technique comprising encoding a series of zero or more data sets, each data set representing a respective range of values of the data items and selecting the series of data sets from a plurality of candidate data sets in dependence upon (i) a number of previously encoded data sets; and (ii) the history data applicable to a given property of the given data item; and
  encoding any remaining value of the given data item, the remaining value being an amount by which the given data item exceeds a maximum value which can be encoded by the first encoding technique, by a second encoding technique different to the first encoding technique.

The present disclosure also provides a method of decoding an input data signal representing successive data items, the method comprising:
  storing history data for decoded data items, the history data indicating one or more aspects of decoding the decoded data items;
  decoding a given data item by a first decoding technique, the first decoding technique comprising decoding a series of zero or more data sets, each data set representing a respective range of values of the data items and selecting the series of data sets from a plurality of candidate data sets in dependence upon (i) a number of previously decoded data sets; and (ii) the history data applicable to a given property of the given data item; and
  decoding any remaining value of the given data item, the remaining value being an amount by which the given data item exceeds a maximum value which can be decoded by the first decoding technique, by a second decoding technique different to the first decoding technique.

The present disclosure also provides apparatus for encoding successive data items, the apparatus comprising:
  a history data store configured to store history data for encoded data items, the history data indicating one or more aspects of encoding the encoded data items;
  first encoder circuitry configured to encode a given data item by a first encoding technique, the first encoding technique comprising encoding a series of zero or more data sets, each data set representing a respective range of values of the data items and selecting the series of data sets from a plurality of candidate data sets in dependence upon (i) a number of previously encoded data sets; and (ii) the history data applicable to a given property of the given data item; and
  second encoder circuitry configured to encode any remaining value of the given data item, the remaining value being an amount by which the given data item exceeds a maximum value which can be encoded by the first encoding technique, by a second encoding technique different to the first encoding technique.

The present disclosure also provides apparatus for decoding an input data signal representing successive data items, the apparatus comprising:
  a history data store configured to store history data for decoded data items, the history data indicating one or more aspects of decoding the decoded data items;
  first decoder circuitry configured to decode a given data item by a first decoding technique, the first decoding technique comprising decoding a series of zero or more data sets, each data set representing a respective range of values of the data items and selecting the series of data sets from a plurality of candidate data sets in dependence upon (i) a number of previously decoded data sets; and (ii) the history data applicable to a given property of the given data item; and
  second decoder circuitry configured to decode any remaining value of the given data item, the remaining value being an amount by which the given data item exceeds a maximum value which can be decoded by the first decoding technique, by a second decoding technique different to the first decoding technique.

The present disclosure also provides a method of encoding successive blocks of data items, the method comprising:
 storing history data for encoded blocks of data items, the history data indicating one or more aspects of encoding the blocks of data items;
 generating a block parameter in respect of a given block of data items, the block parameter depending at least in part upon history data applicable to the given block of data items;
 encoding a given data item of the given block of data items by a first encoding technique, the first encoding technique comprising encoding a series of zero or more data sets, each data set representing a respective range of values of the data items and selecting the series of data sets from a plurality of candidate data sets in dependence upon the block parameter generated for the given block of data items; and
 encoding any remaining value of the given data item, the remaining value being an amount by which the given data item exceeds a maximum value which can be encoded by the first encoding technique, by a second encoding technique different to the first encoding technique.

The present disclosure also provides a method of decoding successive blocks of data items, the method comprising:
 storing history data for decoded blocks of data items, the history data indicating one or more aspects of decoding the blocks of data items;
 generating a block parameter in respect of a given block of data items, the block parameter depending at least in part upon history data applicable to the given block of data items;
 decoding a given data item of the given block of data items by a first decoding technique, the first decoding technique comprising decoding a series of zero or more data sets, each data set representing a respective range of values of the data items and selecting the series of data sets from a plurality of candidate data sets in dependence upon the block parameter generated for the given block of data items; and
 decoding any remaining value of the given data item, the remaining value being an amount by which the given data item exceeds a maximum value which can be decoded by the first decoding technique, by a second encoding technique different to the first decoding technique.

The present disclosure also provides apparatus for encoding successive blocks of data items, the apparatus comprising:
 a history data store configured to store history data for encoded blocks of data items, the history data indicating one or more aspects of encoding the blocks of data items;
 generator circuitry configured to generate a block parameter in respect of a given block of data items, the block parameter depending at least in part upon history data applicable to the given block of data items;
 first encoder circuitry configured to encode a given data item of the given block of data items by a first encoding technique, the first encoding technique comprising encoding a series of zero or more data sets, each data set representing a respective range of values of the data items and selecting the series of data sets from a plurality of candidate data sets in dependence upon the block parameter generated for the given block of data items; and
 second encoder circuitry configured to encode any remaining value of the given data item, the remaining value being an amount by which the given data item exceeds a maximum value which can be encoded by the first encoding technique, by a second encoding technique different to the first encoding technique.

The present disclosure also provides apparatus for decoding successive blocks of data items, the apparatus comprising:
 a history data store configured to store history data for decoded blocks of data items, the history data indicating one or more aspects of decoding the blocks of data items;
 generator circuitry configured to generate a block parameter in respect of a given block of data items, the block parameter depending at least in part upon history data applicable to the given block of data items;
 first decoder circuitry configured to decode a given data item of the given block of data items by a first decoding technique, the first decoding technique comprising decoding a series of zero or more data sets, each data set representing a respective range of values of the data items and selecting the series of data sets from a plurality of candidate data sets in dependence upon the block parameter generated for the given block of data items; and
 second decoder circuitry configured to decode any remaining value of the given data item, the remaining value being an amount by which the given data item exceeds a maximum value which can be decoded by the first decoding technique, by a second encoding technique different to the first decoding technique.

Further respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
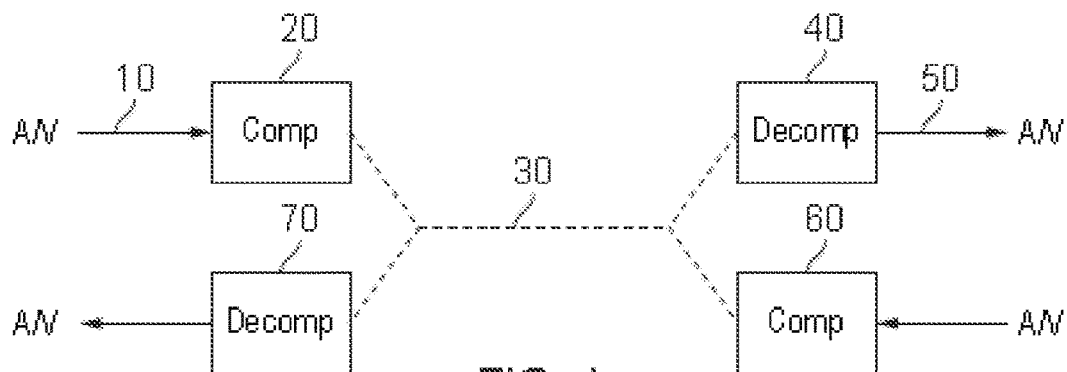
FIG. 1 schematically illustrates an audio/video (AN) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression. In this example, the data values to be encoded or decoded represent image data.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
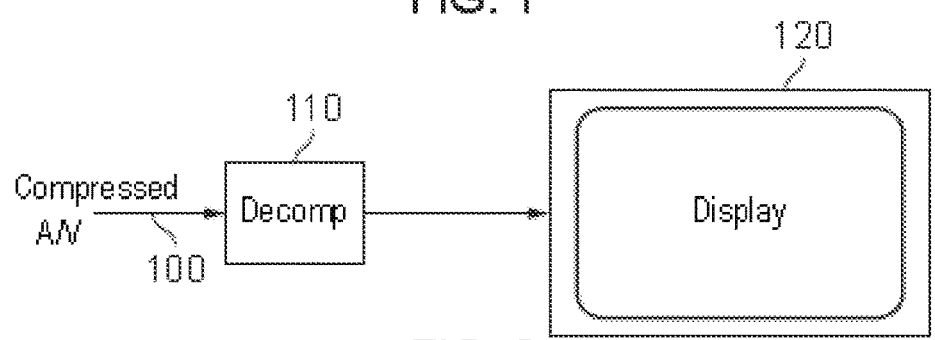
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
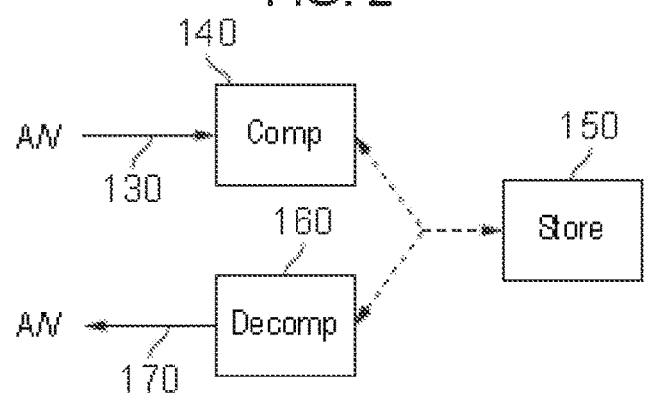
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
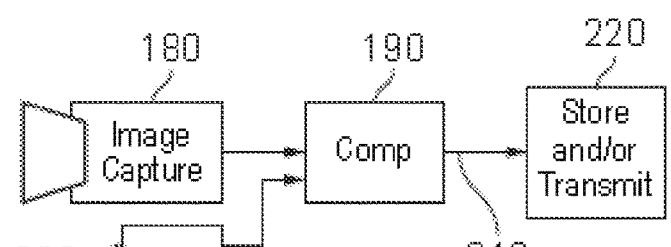
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

Figure 5:
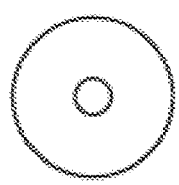
FIGS. 5 and 6 schematically illustrate storage media.
Figure 6:
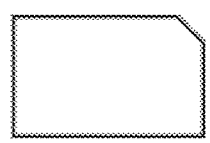

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
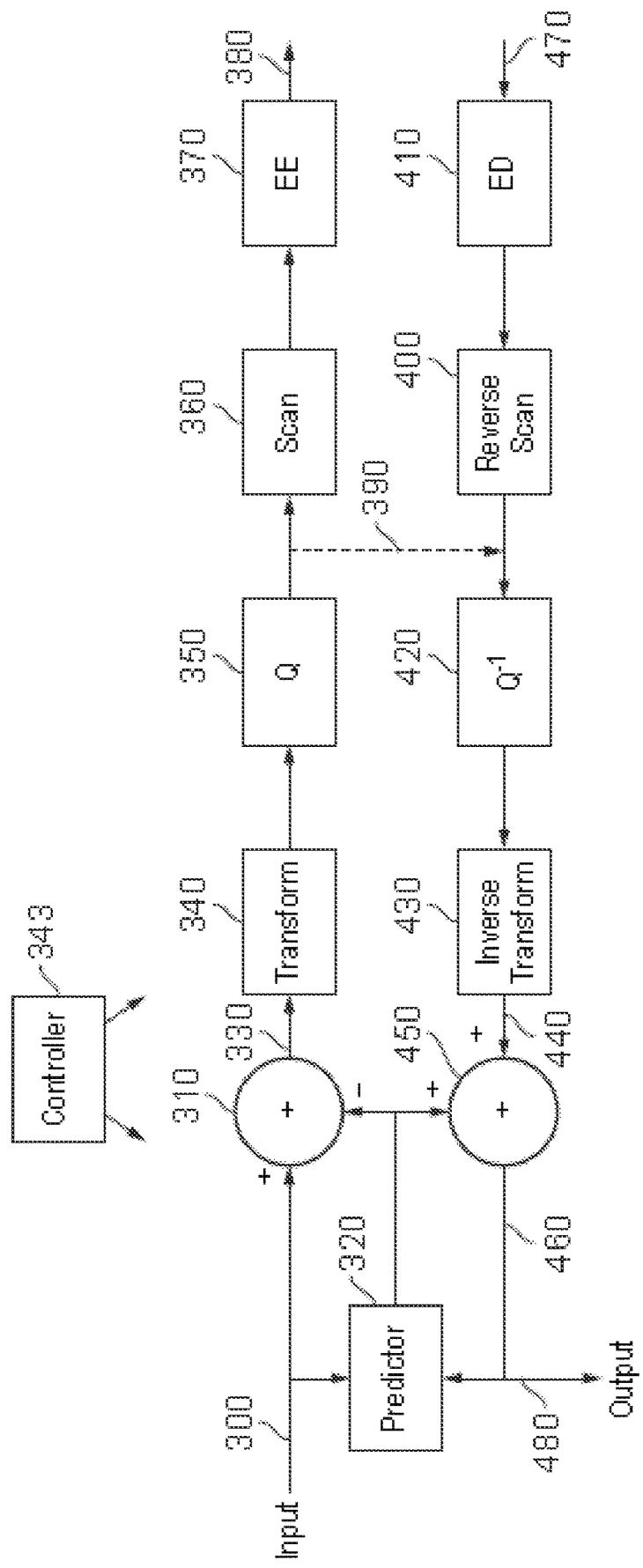
FIG. 7 provides a schematic overview of a video data compression and decompression apparatus.

FIG. 7 provides a schematic overview of a video or image data compression and decompression apparatus, for encoding and/or decoding image data representing one or more images.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to form part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and predicted images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

Therefore, encoding (using the adder 310) involves predicting an image region for an image to be encoded; and generating a residual image region dependent upon the difference between the predicted image region and a corresponding region of the image to be encoded. In connection with the techniques to be discussed below, the ordered array of data values comprises data values of a representation of the residual image region. Decoding involves predicting an image region for an image to be decoded; generating a residual image region indicative of differences between the predicted image region and a corresponding region of the image to be decoded; in which the ordered array of data values comprises data values of a representation of the residual image region; and combining the predicted image region and the residual image region.

The remainder of the apparatus acting as an encoder (to encode the residual or difference image) will now be described.

The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder. In other examples a so-called "transform-skip" mode can selectively be used in which no transform is applied.

Therefore, in examples, an encoding and/or decoding method comprises predicting an image region for an image to be encoded; and generating a residual image region dependent upon the difference between the predicted image region and a corresponding region of the image to be encoded; in which the ordered array of data values (to be discussed below) comprises data values of a representation of the residual image region.

The output of the transform unit 340, which is to say (in an example), a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a diagonal order such as a so-called up-right diagonal scanning order.

The scanning order can be different, as between transform-skip blocks and transform blocks (blocks which have undergone at least one spatial frequency transformation).

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, whether the compressed data was transformed or transform-skipped or the like, provides a compressed output video signal 380.

However, a return path 390 is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, so in the present embodiment the return path 390 is from the output of the quantiser 350 to the input of a complimentary inverse quantiser 420. In instances where loss or potential loss is introduced by a stage, that stage (and its inverse) may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460 (although this may be subject to so-called loop filtering and/or other filtering before being output—see below). This forms one input to the image predictor 320, as will be described below.

Turning now to the decoding process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480 (subject to the filtering processes discussed below). In practice, further filtering may optionally be applied (for example, by a loop filter 565 shown in FIG. 8 but omitted from FIG. 7 for clarity of the higher level diagram of FIG. 7) before the signal is output.

Figure 8:
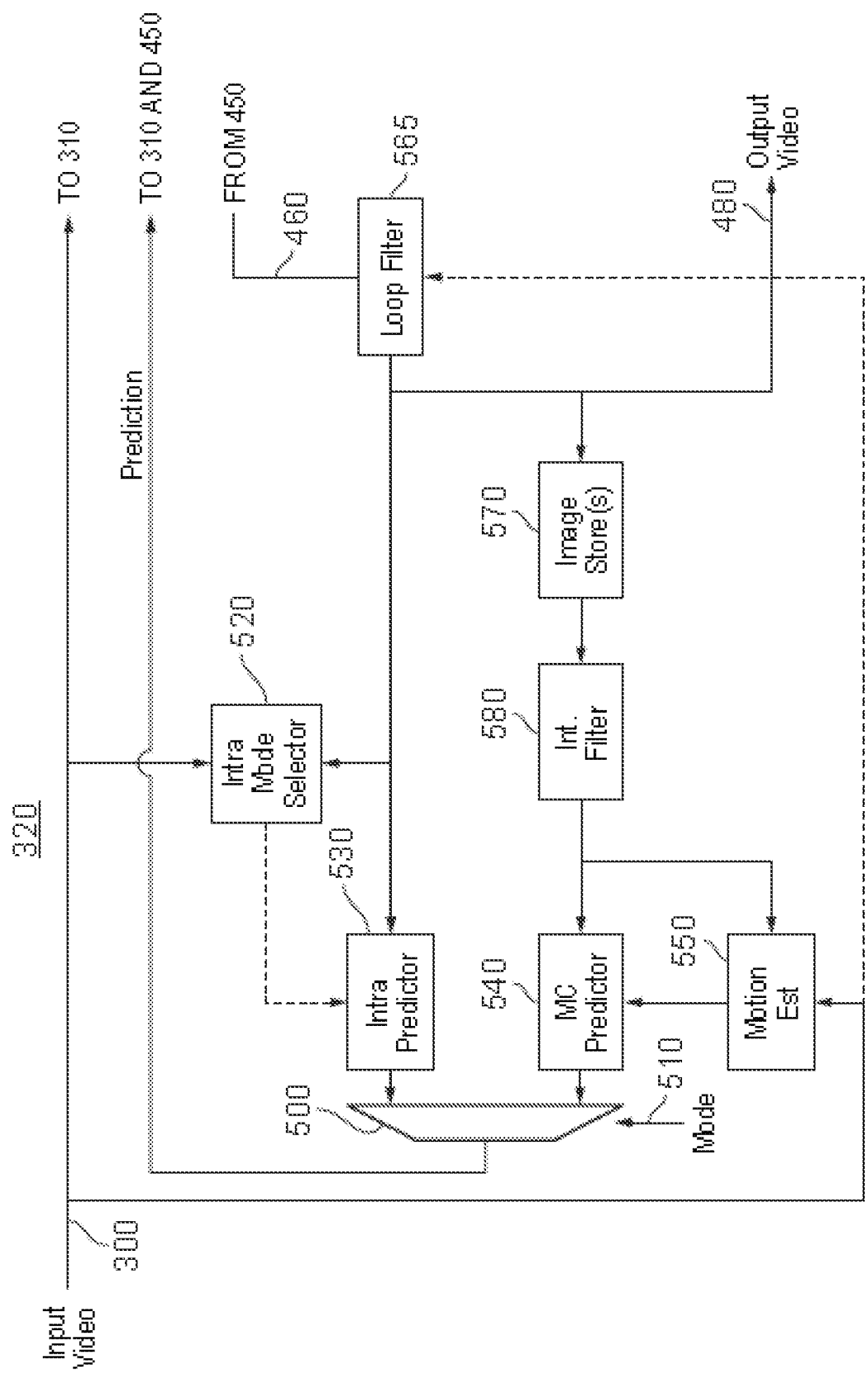
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output data-stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460 (as filtered by loop filtering; see below), which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described.

Firstly, the signal may be filtered by a so-called loop filter 565. Various types of loop filters may be used. One technique involves applying a "deblocking" filter to remove or at least tend to reduce the effects of the block-based processing carried out by the transform unit 340 and subsequent operations. A further technique involving applying a so-called sample adaptive offset (SAO) filter may also be used. In general terms, in a sample adaptive offset filter, filter parameter data (derived at the encoder and communicated to the decoder) defines one or more offset amounts to be selectively combined with a given intermediate video sample (a sample of the signal 460) by the sample adaptive offset filter in dependence upon a value of: (i) the given intermediate video sample; or (ii) one or more intermediate video samples having a predetermined spatial relationship to the given intermediate video sample.

Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the loop filter unit 565 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images may be passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in SERIES H: AUDIOVISUAL AND MULTIMEDIA SYSTEMS Infrastructure of audio-visual services—Coding of moving video High efficiency video coding Recommendation ITU-T H.265 12/2016. Also: High Efficiency Video Coding (HEVC) algorithms and Architectures, Editors: Madhukar Budagavi, Gary J. Sullivan, Vivienne Sze; chapter 3; ISBN 978-3-319-06894-7; 2014 which are incorporated herein in their respective entireties by reference.

In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks or arrays (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

Transform-Skip Mode

Figure 9:
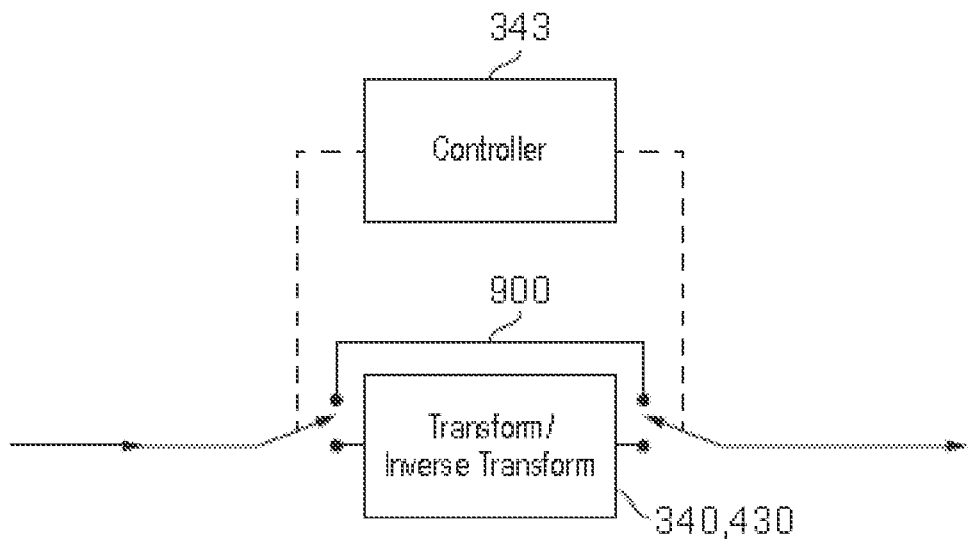
FIG. 9 schematically illustrates a transform-skip mode.

FIG. 9 schematically illustrates a so-called transform-skip mode. In this mode, blocks of samples, for example rectangular encoding blocks or arrays of samples such as so-called transform units (TUs) are assigned a 'transform-skip' mode indicator, for example by a part of the functionality of the controller 343. When the transform-skip indicator is set, as shown by the schematic bypass path 900 in FIG. 9, the transform unit 340 (in the encoding path) and the inverse transform unit 430 (in the decoding path of the encoding side or in a decoder) is bypassed so that no spatial frequency transform is applied to the samples in that particular block.

The transform-skip mode is selectable by the controller 343, alongside a possible selection, of, DCT, DST or another transform mode, in dependence upon properties of the block in question, properties of nearby blocks, trial (full or partial) encodings or the like. Generally, the aim of the selection algorithm executed by the controller 343 is to improve the efficiency of the encoding of the block in question.

In some previously proposed example arrangements, transform-skip mode was restricted to 4×4 block sizes or smaller. In more recent examples, this restriction has been relaxed and the transform-skip mode can be selectively applied to larger blocks. The transform-skip mode can be applied to a TU even when the TU is actually processed as multiple (smaller) sub-TUs.

Figure 10A:
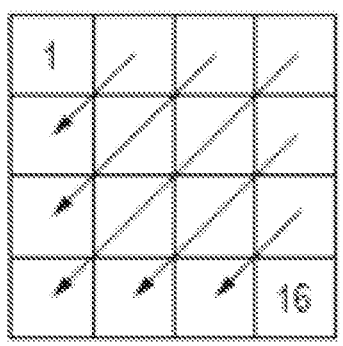
FIGS. 10a, 10b, 11a and 11b schematically illustrate respective scanning directions.
Figure 11A:
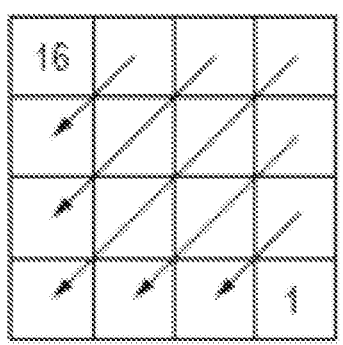

FIGS. 10a and 11a schematically illustrate respective scanning directions, with FIG. 10a providing an example applicable to a 4×4 transform-skip block and FIG. 11a providing an example applicable to a so-called transform block, which is to say a block for which transform-skip mode was not enabled and so the block has undergone a spatial frequency transform (or more than one frequency transform) by the transform unit 340 during encoding.

Referring to FIG. 10a, in the case of transform-skip blocks, the scan order is in this example a diagonal order from the top left ("1") to lower right ("16"). In contrast, as shown in FIG. 11a, in the case of a transform block (as an example of an encoding block) the scan order is a diagonal order from the lower right to top left. Note that the scan order in use makes little substantive difference to the techniques to be discussed below other than in terms of which coefficients or samples are available "already encoded" or "already decoded" for use in the derivation of encoding parameters for subsequent samples or coefficients.

In the case of larger blocks, a similar scan order can be used, or sub-blocks of (for example) 4×4 coefficients such as sub-TUs can be scanned as shown, with a predetermined pattern being used to scan each sub-block in order.

In general terms, the blocks of samples or coefficients may be considered as groups of data values (or, once encoded, groups of encoded data values), each having an associated encoding order (in other words, the scan order as illustrated by the examples of FIGS. 10a and 11a).

Figure 10B:
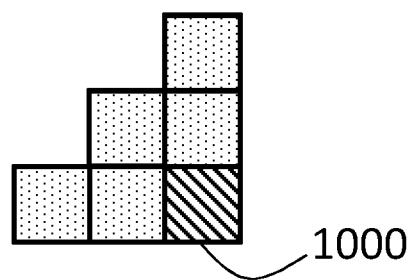
Figure 11B:
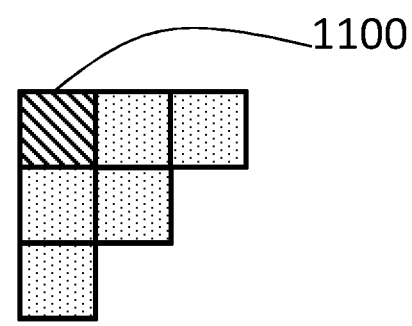

Referring to FIGS. 10b and 11b, in at least some examples of processing to be discussed below, reference is made to samples or coefficients (which may for convenience be referred to below by the single generic term "coefficients" even in the case of transform-skip blocks) which have been encoded or decoded before encoding or decoding of a given coefficient 1000, 1100. In the case of transform-skip, the previously handled coefficients relevant to at least some of the techniques discussed below will be coefficients in a predetermined grouping or pattern as shown in shaded form (one box for each coefficient), which are above and left of the given coefficient 1000. In the case of non-transform-skip operation, a similar predetermined pattern or grouping is used but here the previously handled coefficients relevant to at least some of the techniques discussed below are coefficients (shown shaded) below and to the right of the given coefficient 1100. As mentioned, these coefficients will be referred to by at least some techniques below. If any coefficient in the relevant shaded group is unavailable, for example because it would fall into another block or a not-yet encoded or not-yet-decoded block, that coefficient is simply omitted from the respective process and where necessary, the result of the process may be normalised to the reduced number of coefficients. (For example, normalisation is relevant to a process deriving a mean of the shaded coefficients but is not relevant to a process detecting a maximum or minimum of the shaded coefficients).

Data Sets and Escape Codes

In example arrangements, the entropy encoding stage (for example, performed by the entropy encoder 370, with the inverse process being performed by the entropy decoder 410) involves encoding the scanned quantized transform coefficients (with the scan applied by the scan unit 360 being accorded to the examples shown in FIGS. 10 and 11 for transform-skip and transform blocks respectively).

The entropy encoding is arranged to encode the values as one or more so-called data sets along with escape codes for remaining values not encoded by the data sets.

To generate the data sets, the data values to be encoded are handled in the encoding order (for example the scan order). The data sets generated in respect of a block of samples such as a 4×4 block or a 4×4 (or other) sub-portion of a larger block are selectable as zero or more of a group of candidate data sets (which is to say, the data sets could be capable of being enabled, just not enabled for a particular coefficient or sub-TU or other block or group), where the group of candidate data sets may include one or more of:

Significance map (Sig) which indicates the position of so-called "significant" coefficients or samples, which is to say non-zero coefficients or samples. A significance flag indicating a non-zero value is coded for each coefficient position in the block.

greater than 1 flag (GT1) which indicates whether the absolute value is greater than 1 for each significant coefficient. In some examples for a 4×4 block, the flag is sent only for the first 8 significant coefficients in the encoding order; in other examples, it can be sent for each significant coefficient. In other examples the GT1 flag is always sent if the significance flag is sent.

"Value & 1" flag or parity flag is effectively the least significant bit (LSB) at this stage (where & signifies a logical AND operation).

greater than 2 flag (GT2) which indicates if the coefficient absolute value is greater than 2 up to and including the first coefficient in the scanning order with this property. Note that the flag is sent only for coefficients larger than 1 as indicated by the GT1 flag.

In some examples, after the occurrence of the first coefficient which is greater than 2 in the scanning order, the GT2 flag is not further sent. However, in at least some of the present examples being discussed, the GT2 flag may be sent at each calculated occurrence or at least up to a particular number of occurrences per coefficient for a sub-TU (such as up to four occurrences, the number of allowable occurrences being selectable for a sub-TU as discussed below).

In some examples, for Non-TS operation, the GT2 flag is coded whenever the GT1 flag is set. The limit of 4 applies to TS and may be applied up to 4 times to each coefficient or until it is not set. Thus if the first GT2 flag is not set then the value is 1 or 2 (depending on parity), if the first is set and the second is not set the value is 3 or 4, and if the first two are set by the third is not the value is 5 or 6 and so on.

Coefficient sign which is provided for the significant coefficients.

The absolute coefficient value (ABS(COEFF)) is modified in response to each coding pass of the above arrangement and the modified value is used in the next pass. The modification is:

At the generation of the significance map, subtract 1;
At the generation of the GT1 map, subtract 1;
At the generation of the value & 1 flag, divide by 2.

This provides an example in which, when one or more data sets are selected, encoding by a first technique comprises modifying the data value after encoding by a given data set to account for values which can be encoded by that data set.

In other words, a coefficient for which one GT2 flag has been generated in fact has a minimum value of 4, as shown in the following example in which each data set is shown in turn, with the following column indicating a remaining value (Val) to be encoded after the modification mentioned above:

| Val (i/p) | Sig | Val | Gt1 | Val | Val&1 | Val | Gt2 |
|---|---|---|---|---|---|---|---|
| 0 | 0 | | | | | | |
| 1 | 1 | 0 | 0 | | | | |
| 2 | 1 | 1 | 1 | 0 | 0 | 0 | 0 |
| 3 | 1 | 2 | 1 | 1 | 1 | 0 | 0 |
| 4 | 1 | 3 | 1 | 2 | 0 | 1 | 1 |
| 5 | 1 | 4 | 1 | 3 | 1 | 1 | 1 |
| 6 | 1 | 5 | 1 | 4 | 0 | 2 | 1 |

Escape Codes

Escape codes are used to encode the remaining absolute level, which is to say level information which has not been encoded by the data sets outlined above. Because of the effective subtraction of 4 discussed above, in an arrangement in which one GT2 flag is always sent when it is applicable, the remaining absolute level needs to be encoded only for "coeff-4". Where more than one GT2 flag is sent for a coefficient, the offset is increased to represent the increasing contribution to the value represented by each successive GT2 flag.

The remaining absolute level is encoded by an escape code, for example, comprising a first portion and a non-unary coded second portion. The second portion may have a length, in bits, dependent on a second portion size value defined by a so-called Rice parameter.

Such an arrangement may be referred to as a Golomb-Rice code in which a value to be encoded is considered as two portions (the first and second portions mentioned above). The first portion is the result of the division of the value to be encoded by M, where $M=2^b$, and the second portion is the remainder for example b least significant bits of the value to be encoded. In the discussion provided here, the parameter b is referred to as the second portion size value.

In examples, the quotient or first portion is encoded using unary coding and is followed by the remainder encoded using, for example, truncated binary encoding. Note that if M=1, then this coding is equivalent to unary coding.

In example embodiments the first portion is a prefix and the second portion is a suffix. For example, the first portion may comprise a unary encoded value. For example, the first portion may comprise a truncated unary value. Note however that the terms "first" and "second" are simply identifiers and do not necessarily imply any requirement for the first portion to precede the second portion in an encoding or transmission order.

Derivation of the Second Portion Size Value on the Encoding Side

Figure 12:
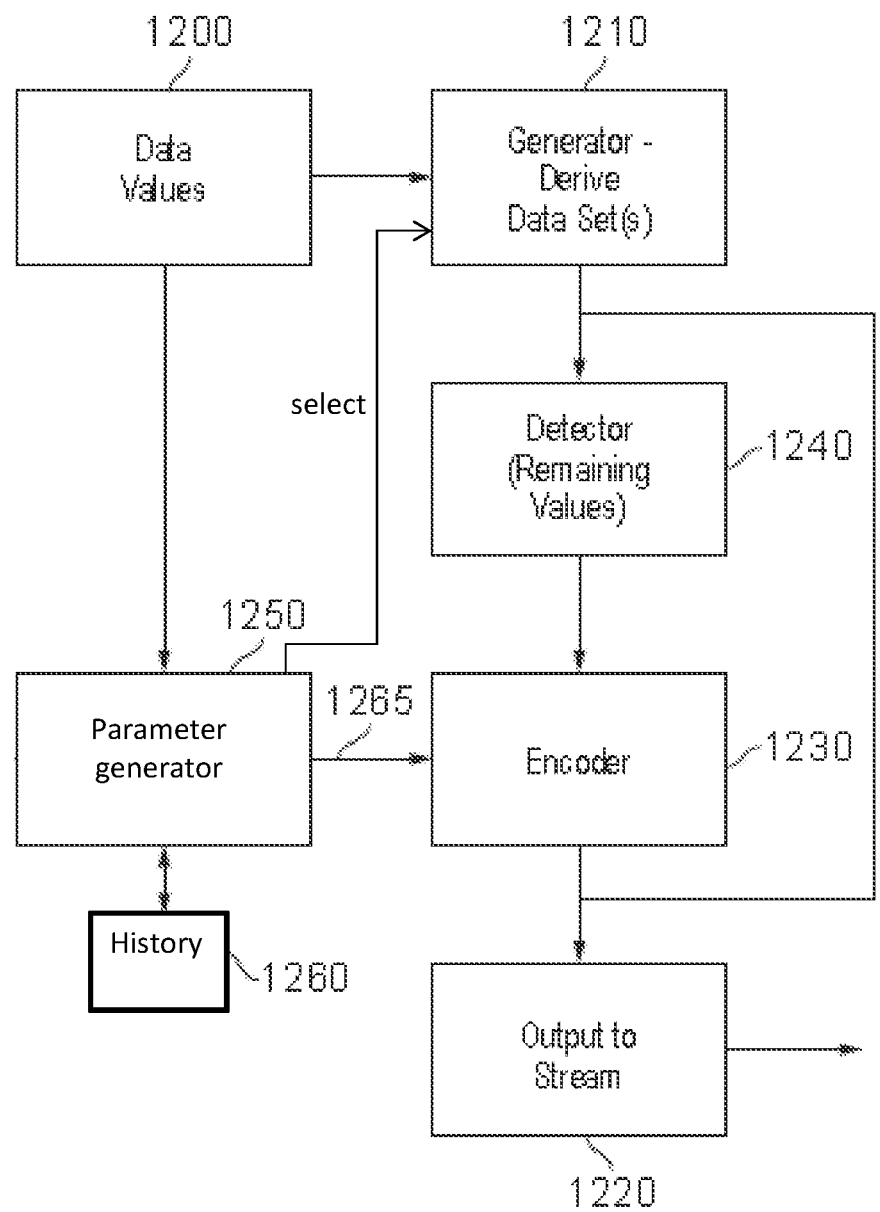
FIG. 12 is a schematic diagram illustrating an encoding apparatus.

FIG. 12 schematically illustrates an example encoding apparatus. The apparatus will be described in detail below, but a significant feature from the point of view of the present discussion is that the apparatus adaptively generates the second portion size value for use in encoding a particular data value, on the basis of previously-encoded data values in the encoding order.

Referring to FIG. 12, data values 1200 are received in the scanning order from the scan unit 360. A generator 1210 generates the data sets described above, namely the significance map, the GT1 flag, the LSB or parity (val & 1) flag and the GT2 flag. These are provided to an output unit 1220 for output to the encoded data stream.

An encoder 1230 encodes the escape codes. The encoder 1230 is responsive to a detector 1240 which detects whether there are any remaining absolute values to be encoded, and also to a generator 1250 which generates the second portion size value. In other words, detection is made as to whether the current data value exceeds the maximum which can be encoded by the data sets in use. The generator 1250 receives as inputs previously encoded data values from the data values 1200 and optionally a parameter defining the bit depth 1255 of the data values 1200, and may refer to a lookup table (LUT) (not shown).

The generator 1250 is responsive to so-called history data stored in a history data store 1260. The history data may represent an array (for example a multi-dimensional array) of counter values or "history data items", established and/or modified using techniques to be discussed below.

The nature of and the use made of history data, in terms of selecting zero or more data sets and in deriving a second portion size, will be discussed in detail below. At the encoder side, the history data store is configured to store history data for encoded data items, the history data indicating one or more aspects of encoding the encoded data items. In some examples, the stored history data is associated with encoded blocks of data items, the history data indicating one or more aspects of encoding the blocks of data items.

The generator 1250 can generate a second portion size value 1265 in respect of each data value 1200, whether or not that data value requires an escape code. Alternatively, a second portion size value may be generated only in respect of data values which do in fact need an escape code.

The encoder 1230 then performs the escape code encoding as discussed above and provides the escape codes to the output unit 1220 for output to the data stream.

In the case that a remaining value is too large to be entirely represented by an escape code (which is to say, the value is larger than the maximum value which can be represented by an escape code using the prevailing parameters), a further type of code (an escape-escape code) may be provided.

By using at least a partial dependency on history data derived from the previously encoded data values as the source information (or at least as part of the source information) to derive the second portion size values, the generator 1250 is using information which will also be available at the decoder side, given that the entropy encoding and decoding process is lossless. So, at the decoder side, a similar derivation can be performed with respect to previously decoded data values. Of course, if the particular entropy encoder and decoding process used was not lossless, then encoded and subsequently decoded data values could be used as the source information at the encoder side, which would be the equivalent of providing the return path 390 in FIG. 7 after the entropy encoding stage. However, given the lossless nature of encoding used in this example, equivalent information can be obtained from the data values to be encoded, at the encoder side and the already-decoded data values at the decoder side.

Figure 13:
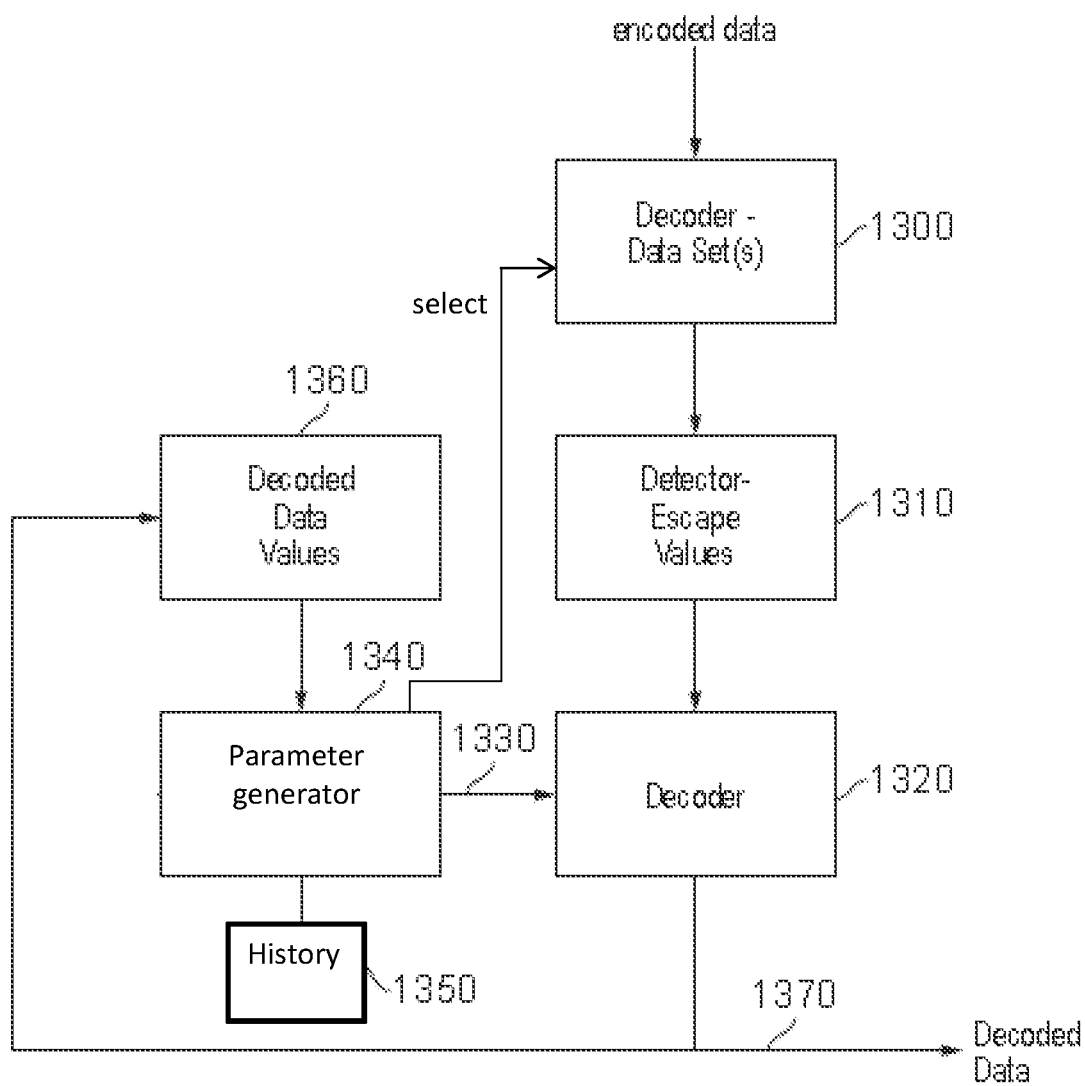
FIG. 13 is a schematic diagram illustrating a decoding apparatus.

Referring to FIG. 13, a decoding apparatus comprises a data set decoder 1300 configured to decode the data sets (up to the GT2 flag) discussed above. A detector 1310 detects whether any escape codes or values are provided and, if so, passes these to an escape code decoder 1320 which applies an inverse operation to the escape code encoding, namely a Golomb-Rice decoding. In order to do this, the decoder 1320 makes use of second portion size value information 1330 provided by a generator 1340 which corresponds in function to the generator 1250 in that it is potentially responsive to the prevailing bit depth and potentially to a lookup table (identical to the lookup table used at the encoder side) and also to history data stored in a history store 1350 dependent upon decoding of the decoded data values 1360. In other words, at the decoder side, the history data store is configured to store history data for decoded data items, the history data indicating one or more aspects of decoding the decoded data items. In some examples, the stored history data is associated with decoded blocks (such as sub-TUs) of data items, the history data indicating one or more aspects of decoding the blocks of data items. The decoder 1320 decodes the escape code(s) using the second portion size value information 1330 and outputs the combination of the decoded data sets with any decoded escape codes as decoded data 1370 which forms the output of the process and which also forms the input 1360 to the generator 1340.

Examples of Encoding and Decoding Techniques

Example techniques for operating the apparatus of FIG. 12 or FIG. 13 will now be described. In the following discussion, FIGS. 14 to 17 concern non-transform-skip (non-TS) operation (that is to say, operation in which a frequency transform, or more than one frequency transform, is used); and FIGS. 18 to 23 concern transform-skip (TS) operation as discussed above.

Figure 14:
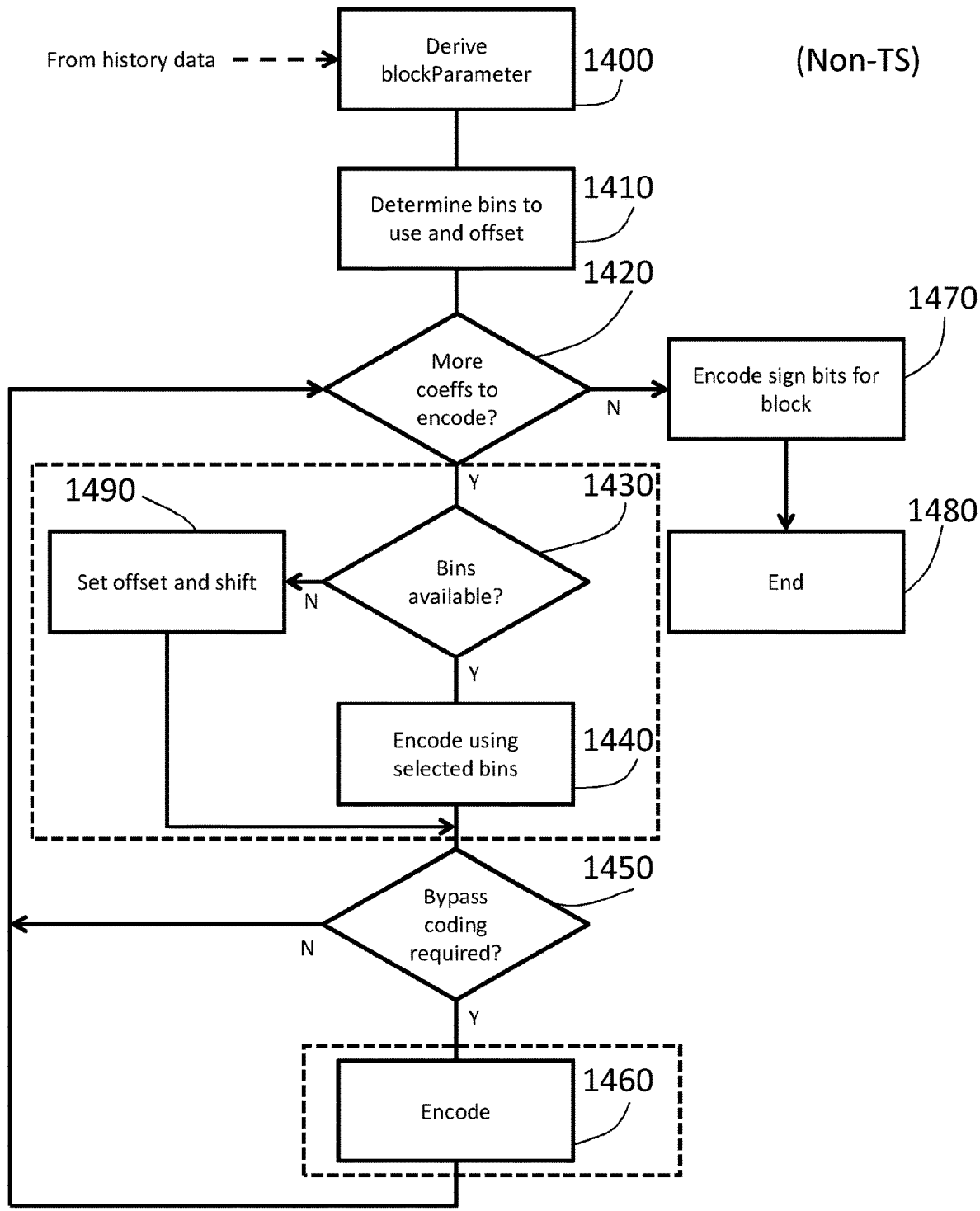
FIGS. 14 to 26 are schematic flowcharts representing respective methods.

FIG. 14 gives an overview of an encoding process applicable to the apparatus of FIG. 12 in the non-transform-skip arrangement.

At a step 1400, the generator 1250, in response to history data stored by the history store 1260, derives a parameter, blockParameter, relating to a current sub-TU. Here, the sub-TU represents a group of samples to be encoded and the parameter derived at the step 1400 represents a group parameter applicable to that sub-TU. The parameter is derived at least in part with respect to history information such as counters relating to previously encoded groups or sub-TUs.

The step 1400 (and 1800 below) represent examples of generating a block parameter in respect of a given block of data items, the block parameter depending at least in part upon history data applicable to the given block of data items.

History Information

The history data is stored in the history store 1260/1350 at the encoder/decoder side and is derived and updated by a later stage in the overall process to be discussed with reference to FIG. 16. History data is derived symmetrically at the encoder and decoder side, so that at any point in the processing, the same history data is available in each case and the same decisions and/or derivations can be made in response to the history data. History data can relate to previously used riceParameters or other information, and may be partitioned in various ways, for example by transform or transform-skip operation, luminance or chrominance component, TU size, Manhattan distance from top left of TU (the Manhattan distance being the distance between two samples measured along axis at right angles) or the like. The counter information is used to derive the blockParameter and also (to be discussed below) a baseRiceParameter.

History data items may be provided as a one- or multi-dimensional array for example, with the dimensions being selected or indexed as one or more of the following:
 current TU size
 position of TU or coefficient in image
 TS or non-TS
 position of coefficient in TU or sub-TU
 Manhattan distance of coefficient from top left or other approaches discussed below with reference to FIGS. 27a to 35
 chroma or luma
 colour component The history data may be provided as one data item per TU or per sub-TU or one history data item per coefficient position or group of coefficient positions.

These possible categories of history data may be summarised as follows:
 colour component represented by the given image data value;
 block size of a block of data values containing the given image data value;
 position of the given image data value in an image;
 position of the given image data value in a block of image data values containing the given image data value;
 position of a block of image data values containing the given image data value in an image;
 position of a sub-block of image data values containing the given image data value within a block of image data values;
 block size of a block of image data values containing the given image data value;
 distance of the given image data value from a predetermined location in a block of image data values containing the given image data value; and
 whether or not the given image data value is generated using a spatial frequency transform.

The history data is looked up (for its use by steps 1400, 1600, 1800, 2000 or its generation by steps 1630, 2030) by the prevailing parameters applicable to the current TU/sub-TU/coefficient. These provide indices into an array, potentially a multi-dimensional array, of history data values to obtain the relevant history data item applicable to the parameters associated with the coefficient and/or block.

The history data may be initialised to all 0 values, for example at the start of encoding or decoding of any one or more of each sequence, image, slice, sub-picture, CTU or the like.

Derivation of blockParameter

The step 1400 selects and derives a parameter, blockParameter, to be used for determining signalling for the current sub-TU.

The dependence on the history data can be in one or more of various example possibilities. In some examples, the history data applicable to the properties of the sub-TU being encoded (or, where history data is provided per coefficient, for an example coefficient such as the top left coefficient) is looked up and is set as the block parameter for that sub-TU.

In other examples, a combination (such as a weighted sum) of history data items relating to multiple coefficient positions is generated and used as the block parameter.

Determination of Bins

At a step 1410, in addition to or in place of its functionality in determining a second portion size, the generator 1250 determines a set of bins or flags to use and an offset and shift for rice coding. This involves determining, in response to the group parameter (blockParameter) discussed above, how many of the data sets available to an encoding step 1440 to use. The data sets may include the significance flag, a greater than one (GT1) flag, a greater than two (GT2) flag and a parity flag. The selection of which of these to use can be in response to the expectation of the magnitude of the values to be encoded which in turn depends upon the blockParameter.

In some examples, the bins are selectable in a hierarchy, which is to say that using the examples just given, the available options at the step 1410 are:
a) None
b) Significance flag only;
c) Significance flag and GT1 flag;
d) Significance flag, GT1 flag and parity flag;
e) Significance flag, GT1 flag, GT2 flag and parity flag In other examples, options (d) and (e) can be interchanged.

For example, the selection can be made as a mapping between the blockParameter and the respective set of flags, for example as:

| blockParameter | Flag or bin set |
| --- | --- |
| 16+ | (a) |
| 7-15 | (b) |
| 4-6 | (c) |
| 2, 3 | (d) |
| 0, 1 | (e) |

In other examples, the hierarchy need not apply as set out above, and there can be a mapping between respective ranges of blockParameter and selections of bins or flags to be used. For example, such a mapping may be:

| blockParameter | Flag or bin set |
| --- | --- |
| 16+ | (a) |
| 7-15 | GT1, parity only |
| 2-6 | GT1, GT2, parity only |
| 0, 1 | (e) |

In non-TS operation, either one or zero GT2 flags are used, so the selection made by the step 1410 is either to use one or no GT2 flags.

The parity flag can be advantageous in terms of coding efficiency for relatively small coefficients, but can become progressively less efficient for larger coefficients, so its use can be disabled where the blockParameter is large (tending to indicate larger coefficients).

The step 1410 also determines the number of encoding bins required to encode the sub-TU using the selected cohort of flags applicable to that TU. Each type of flag has an associated requirement in terms of encoding bins, allowing the step 1410 to compute how many bins are needed either for each coefficient or, based on the block size (for example, the sub-TU size), for the block.

The step 1410 sets the offset for rice coding so that it represents the largest value represented by the cohort of flags actually used, for example 0, 1, 2, 2, 4 for the options (a) to (e) respectively as set out above. A value "shift" is set to 1 if the parity flag is used or 0 otherwise.

Control then passes to a step 1420 at which a detection is made as to whether there remain more coefficients to encode in the current sub-TU.

CABAC Encoding

Encoding according to the selected bins or flags is performed using CABAC techniques and takes place by steps 1430, 1440, 1490. These are shown surrounded by a broken line box to indicate the possibility at this stage that encoding can be performed for the entire block (for example sub-TU) before moving onto the question of dealing with any bypass coding. In other words, these three steps can operate in a sub-loop but for clarity of the diagram, this sub-loop is not drawn explicitly. In other examples, the steps 1430, 1440, 1490 can be performed for a single coefficient, with control then moving onto the steps 1450, 1460 in respect of that coefficient before returning to the step 1420. Either option is encompassed as an embodiment of the present disclosure.

Assuming that there are coefficients to encode at the step 1420, control passes to the step 1430 at which a detection is made as to whether there are sufficient bins which remain available at this stage in encoding the image to encode a next coefficient using the bins required for the currently selected set of flags as determined at the step 1410. If the answer is yes then encoding is performed at a step 1440 using the selected bins. The step 1440 will be described in greater detail below. If the answer is no at the step 1430 then control passes to step 1490 at which the offset for rice coding is set to zero and shift is set to zero and control passes to a step 1450. In terms of a sub-loop to perform the CABAC encoding on a block basis, control passing to the step 1490 represents the end of that sub-loop, which is to say that control falls out of the sub-loop and CABAC encoding is over as regards the current block.

In the case of the sub-loop arrangement, control would pass from the step 1440 back to the step 1430 until the sub-loop has completed and the whole block has been CABAC encoded.

At the end of the sub-loop for CABAC encoding, either the successful outcome of the step 1440 at the end of the sub-loop or early termination by the outcome of the step 1490 pass control to the step 1450 at which a detection is made as to whether bypass coding is required. If the answer is no then control returns to the step 1420. If the answer is yes then control passes to a step 1460 at which bypass coding is performed. The step 1460 will be described in greater detail below.

Note that bypass encoding can be performed on a similar sub-loop basis for the entire block or sub-TU, as indicated schematically by a broken-line box surrounding the step 1460. So, in the sub-loop arrangement, all of the applicable CABAC encoding is performed first and then all of the applicable bypass coding is performed.

Returning to the negative outcome of the step 1420, if no more coefficients remain to be encoded in the current sub-TU (either because both sub-loops have fully executed or because a main loop on a coefficient-by-coefficient basis has been performed for each coefficient) then sign bits are encoded for that sub-TU at a step 1470 and the process ends at a step 1480.

This therefore provides an example of encoding 1440, 1840 (below) a given data item of the given block of data items by a first encoding technique, the first encoding technique comprising encoding a series of zero or more data sets, each data set representing a respective range of values of the data items and selecting 1410, 1810 the series of data sets from a plurality of candidate data sets in dependence upon the block parameter generated for the given block of data items.

Decoding

A corresponding arrangement can be used at the decoding side. The derivation of the blockParameter and/or the bins to use and offset (the steps 1400, 1410) are performed identically with respect to history data stored in the history store

1350, for example history data relating to previously decoded blocks. The steps 1400, 1410 are performed by the generator 1340 at the decoder side. The steps 1440, 1470, 1460 at the decoder side relate to decoding operations rather than encoding operations; the tests 1420, 1450 relate to whether more coefficients remain to be decoded and whether by bypass decoding is required. The generation of the blockParameter and other similar parameters within the arrangement of FIG. 14 is performed by the generator 1340. Similar sub-loop arrangements are performed at the decoder side if they are used at the encoded side.

Therefore, references to encoding steps or processes in the discussion of FIGS. 14 to 21 should also be taken to refer to corresponding and symmetric decoding steps and processes at the decoder side, with decisions and derivations being made in dependence upon the same source history data (derived from already decoded rather than already encoded coefficients).

Detailed Discussion of the Step 1440

The step 1440 is shown in more detail in FIG. 15, again for the non-transform-skip situation.

Steps 1500, 1530, 1560 and 1580 represent tests to detect whether the step 1410 selected for the significance flag, the GT1 flag, the GT2 flag and the parity flag to be used. In each case there is a positive outcome drawn to the right hand side representing the situation in which the step 1410 had determined that the respective flag should be used, and a negative outcome drawn vertically downwards representing the situation in which the step 1410 had determined that the respective flag should not be used.

In the case of the significance flag, if it is to be used, then control passes to a step 1510 at which the significance map is encoded and the number of bins available is decremented by the number used to encode the significance map. If, at a step 1420, the sub-TU is fully coded (which is detected by detecting whether a "coded" flag indicating that the significance flag was encoded is set to indicate "not encoded"; if however the significance flag was "encoded" at the step 1520 then it cannot be guaranteed that the encoding process has been fully performed) then control passes to the output of the step 1440, in other words to the step 1450 of FIG. 14. If not, control passes to the next test 1530 which, in the affirmative outcome, passes control to a step 1540 at which the GT1 map is encoded and the number of bins available is decremented. Again, if the sub-TU is fully coded (as indicated by the GT1 flag not having been used in this instance) then control passes to the step 1450, but if not the next test 1560 is implemented. If the answer is yes then the GT2 map is encoded and the bins available are decremented at a step 1570. Similarly, if the outcome of the step 1580 is yes then the parity is encoded and the bins available decremented at a step 1590.

Figure 15:
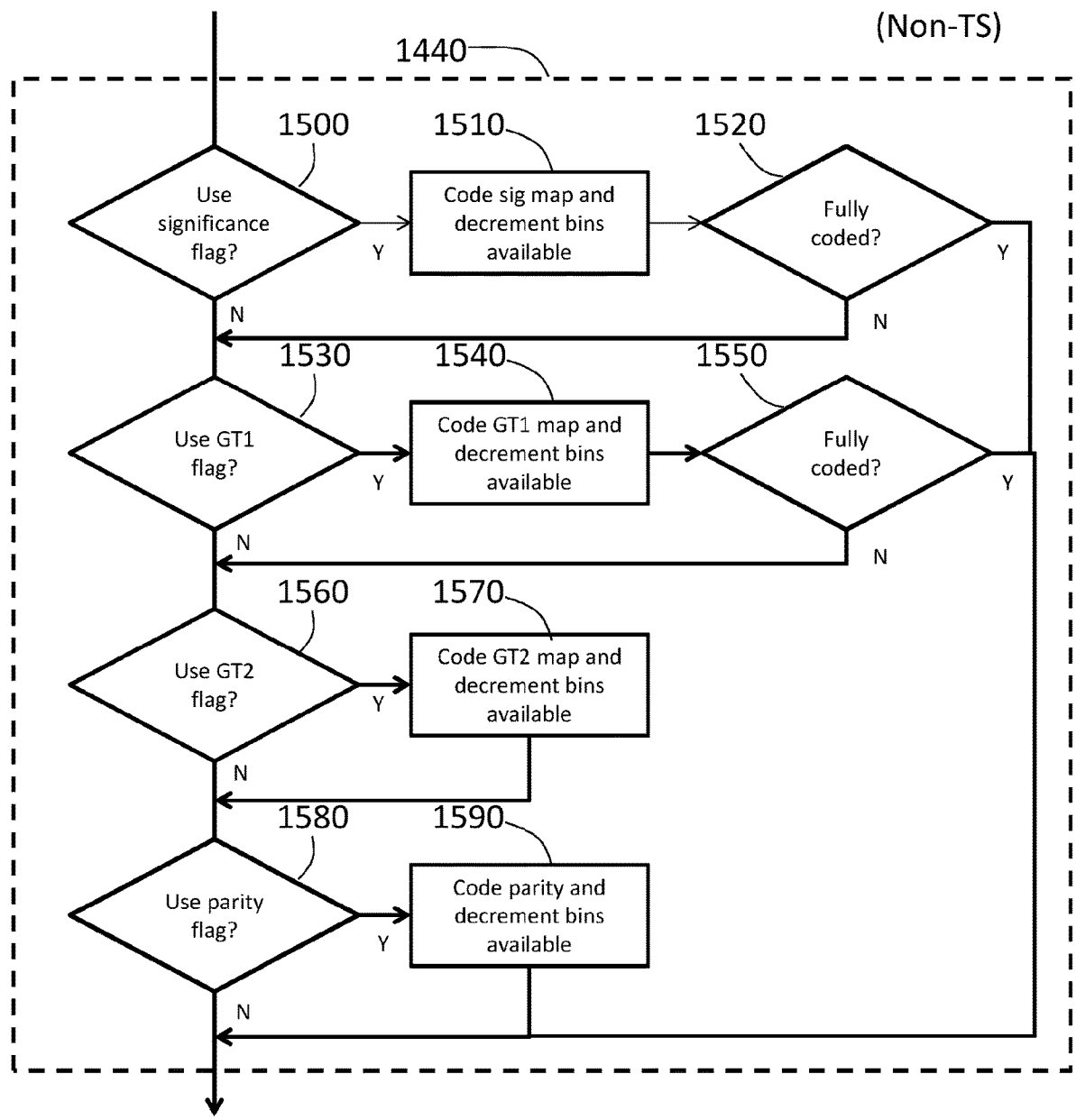

For a particular selection of data sets, the technique of FIG. 15 provides an example in which, when two or more data sets are selected, encoding by the first technique comprises encoding by the two or more data sets in a predetermined data set order.

Bypass Coding

Bypass coding is performed using Rice encoding dependent upon a Rice parameter as discussed above, so that a second encoding technique comprises encoding an escape code comprising a first portion and a non-unary coded second portion having a length, in bits, dependent upon a second portion size.

Figure 16:
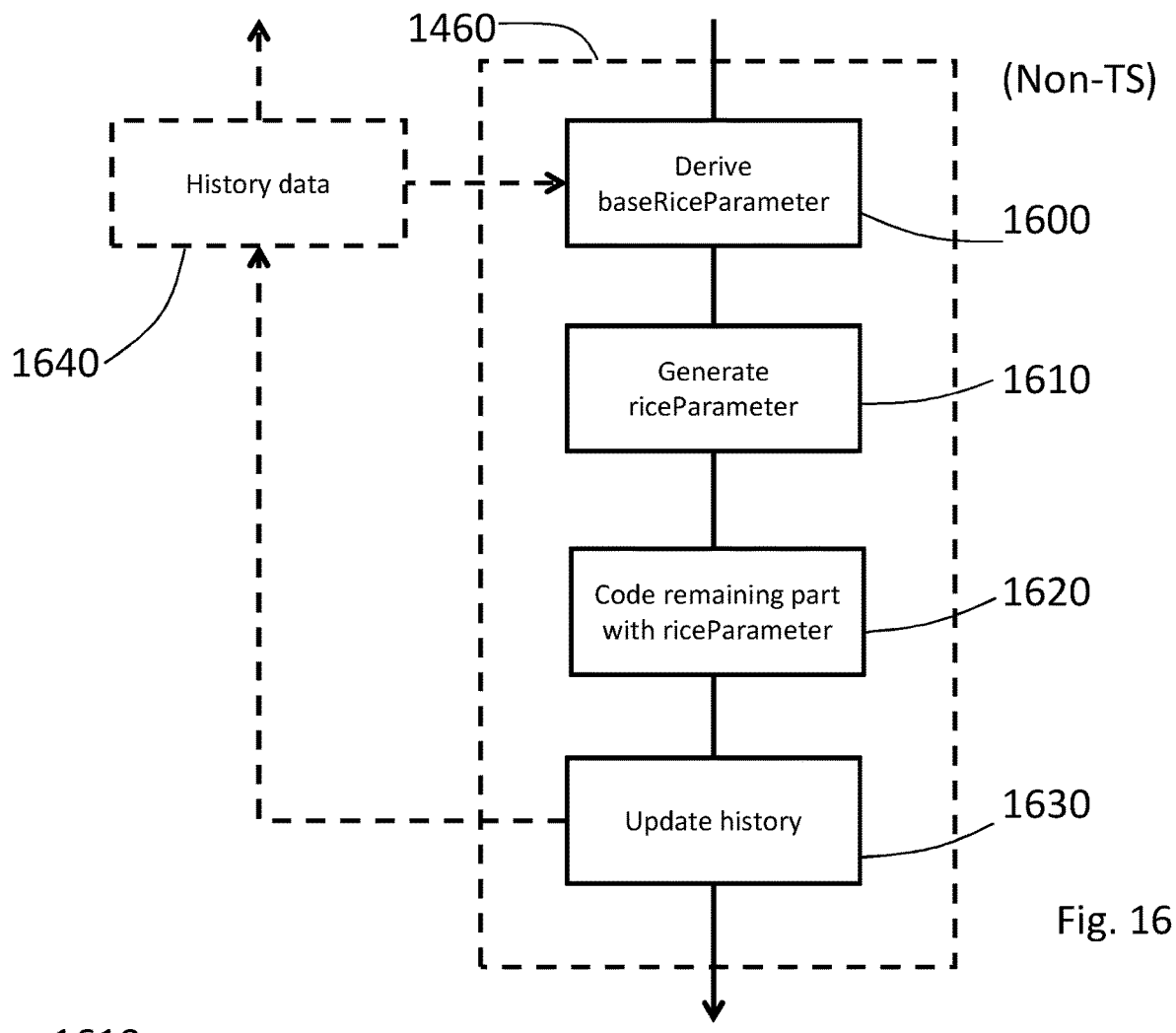

FIG. 16 provides more detail of the step 1460 described above, again in the context of non-transform-skip operation. In FIG. 16, the information 1640 stored in the history store 1260/1350 is shown schematically in broken line. As well as providing an input to the step 1400 discussed above it also provides an input to a step 1600 and is updated by a step 1630 both to be discussed below.

The step 1460 comprises steps 1600 . . . 1630 as drawn in FIG. 16 and the process may be conducted on a coefficient-by-coefficient basis or a sub-loop basis for an entire block as discussed above.

At the step 1600, a baseRiceParameter is established, to be used for determining signalling for the sub-TU. For example:

baseRiceParameter=mapping (selected history data item)

Here, mapping is equal to the respective history data item divided by four, sixteen or another value, and the selected history data item selects the history data item corresponding to the current state of the transform-skip flag or other such flags, component (or luma/chroma), block size, scaled Manhattan distance or the like.

At a step 1610, a parameter riceParameter is generated. The step 1610 is described in more detail with reference to FIG. 17 to be discussed below.

At a step 1620, the remaining part of a current coefficient (being any value in excess of the maximum value which could be encoded at the step 1440) is coded as a bypass value using Rice coding according to the parameter riceParameter and at the step 1630, the history data 1640 is updated.

In summary, bypass encoding can be considered to represent encoding any remaining value of the given data item, the remaining value being an amount by which the given data item exceeds a maximum value which can be encoded by the first encoding technique, by a second encoding technique different to the first encoding technique.

Updating of History Data

Example updates (as examples of the storing step comprising modifying at least the stored history data applicable to the given property of the given data item in response to encoding of the given data item) can include overwriting a history data item with a computed riceParameter, incrementing a history data item for example using any one or more of the following example techniques:

reset history data to all 0 values, for example (as mentioned above) at the start of encoding or decoding of any one or more of each sequence, image, slice, sub-picture, CTU or the like;

as above, but reset to a non-zero value such as a value computed from the bit depth of the coefficients (for example, (bit depth−10)*divisor update history data for all coefficients or only for all non-zero coefficients;

update history data only for those coefficients of greater than a threshold (non-zero) absolute value, such as 4;

overwrite a history data item indexed by the current block/coefficient parameters by the riceParameter;

selective increment or decrement of a history data value in dependence upon absolute coefficient values, for example:

if value$>$=(3<<(riceParameter)) increment history data item;

if (value<<1)<(1<<riceParameter) then decrement history data item selective increment or decrement of a history data value ("count"), for example:

if value$>$=(3<<(count/divisor))) increment count;

if (value<<1)<(1<<count/divisor) then decrement count in some examples, the decrementing process can involve setting the history data item to max(0, history data item−decrement value) (decrement value being for example, 1 or another value as discussed below);

in some examples, the amount or quantum of an increment can be greater than the amount of a decrement; for example increment by +3 or +4, decrement by −1 (with the optional feature of constraining to a lowest allowable value of zero as mentioned above);

more generally, the increment and decrement amounts can be different;

where value=coefficient value coded by the escape coding process that has been encoded at that coefficient position.

Divisor is selected in conjunction with increment and decrement. For example, where increment=+4 and decrement=−1, divisor=16. Divisor is typically a power of two so that it can be implemented using a simple shift. It is also used in the process to generate candidate Rice parameters discussed below.

The update could be conditional, for example updating any individual history data item at the most once per sub-TU.

The update could update more than one history data item, for example updating history data items relating to neighbouring sample positions.

The conditional updates based on coefficient value mentioned in the list above provide examples of a modifying step comprising selectively modifying at least the stored history data applicable to the given property of the given data item in response to encoding of the given data item, only when the given data item exceeds a threshold absolute value. For example, the threshold may be 0 or 4.

In general, the modifications made to the history data can be such that the history data represents one or more aspects indicative of a magnitude of the encoded (decoded) data items.

For example, the one or more aspects of encoding the encoded data items comprise data dependent upon a second portion size generated to encode the encoded data items.

Generating Candidate Rice Parameters

Figure 17:
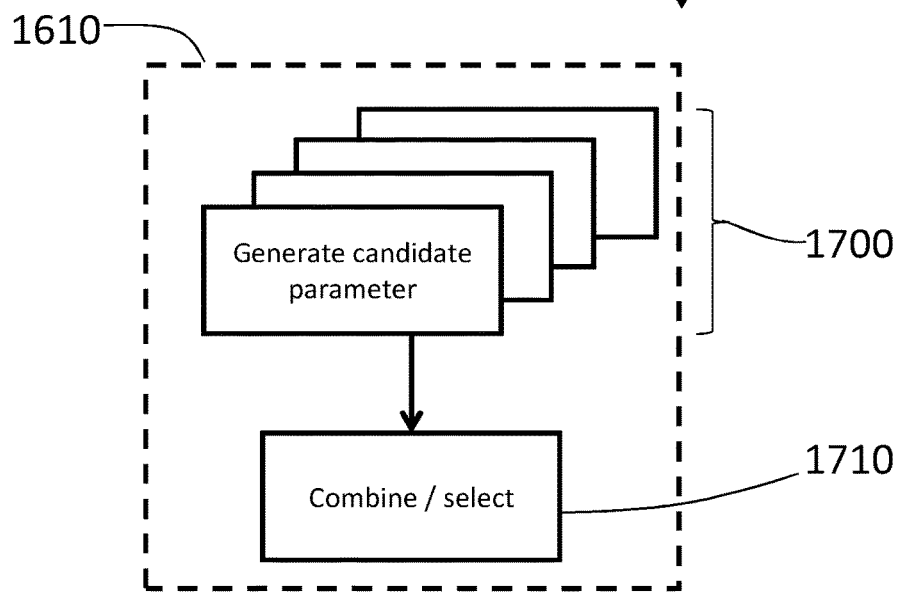

Referring to FIG. 17, the step 1610 comprises one or more steps 1700 of generating candidate riceParameters. Examples of the candidate riceParameters include:
  i. A default WC technique
  ii. An adaptive WC technique
  iii. A base Rice technique
  iv. A local technique This arrangement provides an example of generating a plurality of candidate second portion sizes (the candidate riceParameters) and selecting amongst the plurality of candidate second portion sizes in dependence upon the history data applicable to the given property of the given data item (in dependence upon baseRiceParameter as discussed below).

In at least the default VVC technique and the adaptive WC techniques, the generating step comprises, for at least one candidate second portion size, obtaining that candidate second portion size by accessing a look-up table according to an index dependent upon at least one previously encoded data item (a dependence upon "sum" in these examples).

(i) In the present example of non-TS operation, the default WC technique (i) involves setting an index value as follows:

index=max(0,min(31,sum−5*offset)

where:
max (A,B) returns the greater of A and B;
min(A,B) returns the lesser of A and B;
offset is the prevailing offset value discussed above;

sum=sum of the available shaded coefficients relative to the current coefficient 1100 in FIG. 11a (with any unavailable coefficients being assumed to be 0);

The index value then provides an index into a look up table (LUT) of Rice parameter values, and riceParameter is set to the indexed LUT value:

riceParameter=LUT (index)

(ii) In the adaptive VVC technique, the variable temp_shift (used for this calculation) is defined as:

temp_shift=max(0,(baseRiceParameter−2)); and index=max(0,min(31,((sum−5*offset)>>temp_shift)

where:
">>n" signifies a right bit shift by n bits (note that "<<n" used below similarly signifies a left shift by n bits);
riceParameter is set to the LUT value (in the same LUT) indexed by index, but with the addition of the amount shift:
riceParameter=LUT (index)+temp_shift As an alternative to the expression given above for index, either of the following could be used:

index=max(0,min(31,(sum>>temp_shift)−5*offset))

or:

index=max(0,min(31,(sum>>temp_shift)−temp_count*offset))

where temp_count is the number of available coefficients used in the computation of sum (potentially less than 5)

In other examples, the following technique (implemented here by example pseudocode) may be used in connection with the adaptive VVC technique. The history data or "count" value is obtained from the multi-dimensional array of history data as a function of (for example) any one or more of the parameters discussed above, for example {a distance value as discussed, TS or non-TS, colour component} temp_shift=max(0,(count/divisor)−2)

{where divisor is a predetermined constant scaling factor discussed above}
If TS mode:

index=template[scan_position,absolute_coefficient_value,cutoff,temp_shift]+temp_shift riceParameter=LUT(index)+temp_shift If not TS mode:

index=template[scan_position,absolute_coefficient_value,cutoff,temp_shift]

riceParameter=LUT(index)+temp_shift

Here, cutoff is the lowest coefficient value that requires being coded with Golomb Rice coding (rather than with flags) (for a previously proposed system this is 0 for TS or 4 for non-TS but here it could be the same as or different to those values).

The "template" is as follows. Template as used in the discussions above relates to the situation of FIGS. 10a-11b and represents the sum of all the coefficients to the bottom right (transform or regular residual coding) or top left (transform skip residual coding) and is present in previously proposed systems such as the so-called Versatile Video Coding system. This pseudocode provides a sum of absolute coefficient values (see FIGS. 10a-11b) with a shift right based on the computed value temp_shift. The introduction of the shift is advantageous. The shift is useful for larger coefficient values (common at higher bit depths) and adjusts the sum of the values down to the 0 . . . 31 scale used for the LUT. Without the shift the sum would typically always be clipped to 31. The addition of the same value after the LUT then corrects the resultant number. The temp_shift is used rather than the baseRiceParameter as this is a normalisation step. Coefficient values within 10 bit profiles (for which previously proposed systems are tuned) result in the values for baseRiceParameter up to about 2. Thus temp_shift ensures the adaption only occurs when it is useful, and is the correct (or at least a useful or appropriate) relative size.

In the particular adaptive VVC example using temp_shift discussed above, the step of generating the plurality of candidate second portion sizes comprises selectively applying a shift amount dependent upon at least the history data.

In the example of the adaptive VVC the applying step comprises at least one of:
(i) applying a right-shift in derivation of the index, the right shift being dependent upon the shift amount; and
(ii) adding the shift amount in derivation of the index.

In the various adaptive VVC examples, the generating step comprises combining a value accessed from the look-up table with a value dependent upon the shift amount (for example riceParameter=LUT (index)+temp_shift). For example the generating step may comprise adding the value accessed from the look-up table to the shift amount.

Note that the term "template" is also used below in a second usage, in connection with picking the history value for the derivation of the original rice value. This is based on the coefficient position—not it's value or the value of coefficients around it. It is a categorization technique for positions which might be expected to have similar coefficient sizes (without examining the values).

(iii) The base Rice technique involves setting the riceParameter to be the baseRiceParameter:
riceParameter=baseRiceParameter
(iv) The local technique is performed as follows:
v=function (shaded neighbours of the given coefficient 1100 in FIG. 11b);
where:
function=maximum, minimum, mean or the like;
then initialise riceParameter as:
riceParameter=baseRiceParameter;
increase or decrease riceParameter as follows:
While v>(3<<(riceParameter)), increment riceParameter;
While v<(3<<(riceParameter−2) and riceParameter>0, decrement riceParameter optionally, apply a maximum number of iterations, for example so that riceParameter is increased or decreased by a maximum of +/−2.

Therefore, generating at least some of the candidate Rice parameters can provide examples of deriving the second portion size at least in part in dependence upon the history data applicable to the given property of the given data item.

Selecting Amongst the Candidate Rice Parameters

At a step 1710, the outcomes of the generation of the candidate parameters are combined and/or selected between to generate the actual riceParameter for use by the step 1620.

In examples, the selection amongst the candidate Rice parameters can be performed in response to the value of baseRiceParameter. Purely by way of example, a selection could be mapped to values of baseRiceParameter as follows:

| baseRiceParameter | Selection |
|---|---|
| 0-1 | (i) default VVC technique |
| 2-3 | (ii) adaptive VVC technique |

-continued

| baseRiceParameter | Selection |
|---|---|
| 4-5 | (iii) base Rice technique |
| 6+ | (iv) local technique |

In other examples, a single selection does not have to be used but instead a combination of two or more candidate Rice parameters can be generated, for example as a weighted sum of the respective candidate Rice parameters, with the candidates to be used in the weighted sum and the weighting provided as mappings of the baseRiceParameter for example.

As discussed above, these processes occur symmetrically at the encoder and decoder side, and always use data which is available to the encoder (representing previously encoded blocks) and to the decoder (representing previously decoded blocks) so that identical outcomes can be obtained in each case.

Transform-Skip Operation

FIGS. 18 to 23 correspond closely to FIGS. 14 to 17 and in many instances corresponding steps are employed. Indeed, the following table represents steps which are substantially identical as between the corresponding step in FIGS. 14 to 17 and the step in FIGS. 18 to 23, and as such these steps will not be described in further detail here. Differences will however be discussed in detail below.

Figure 18:
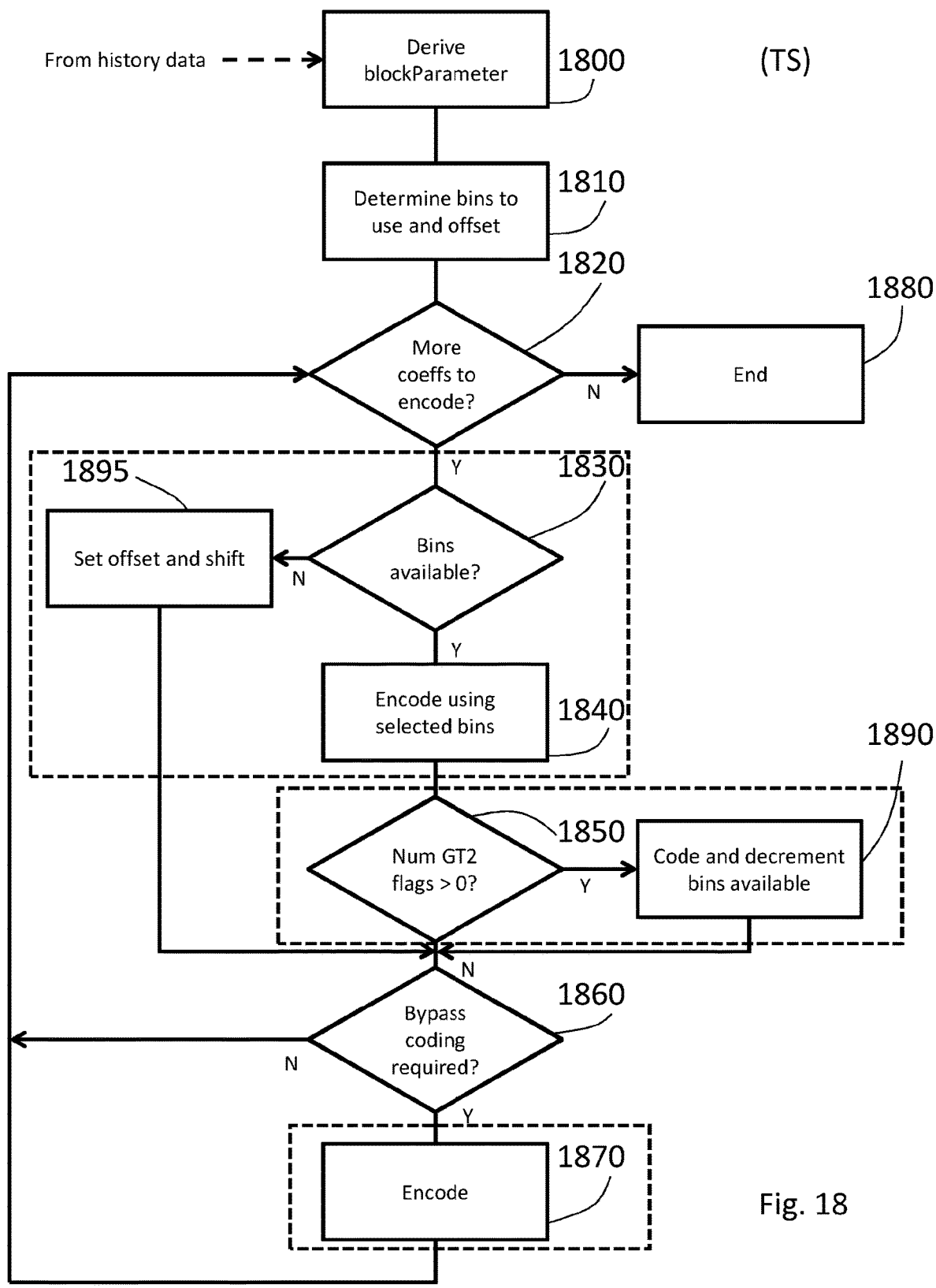
Figure 19:
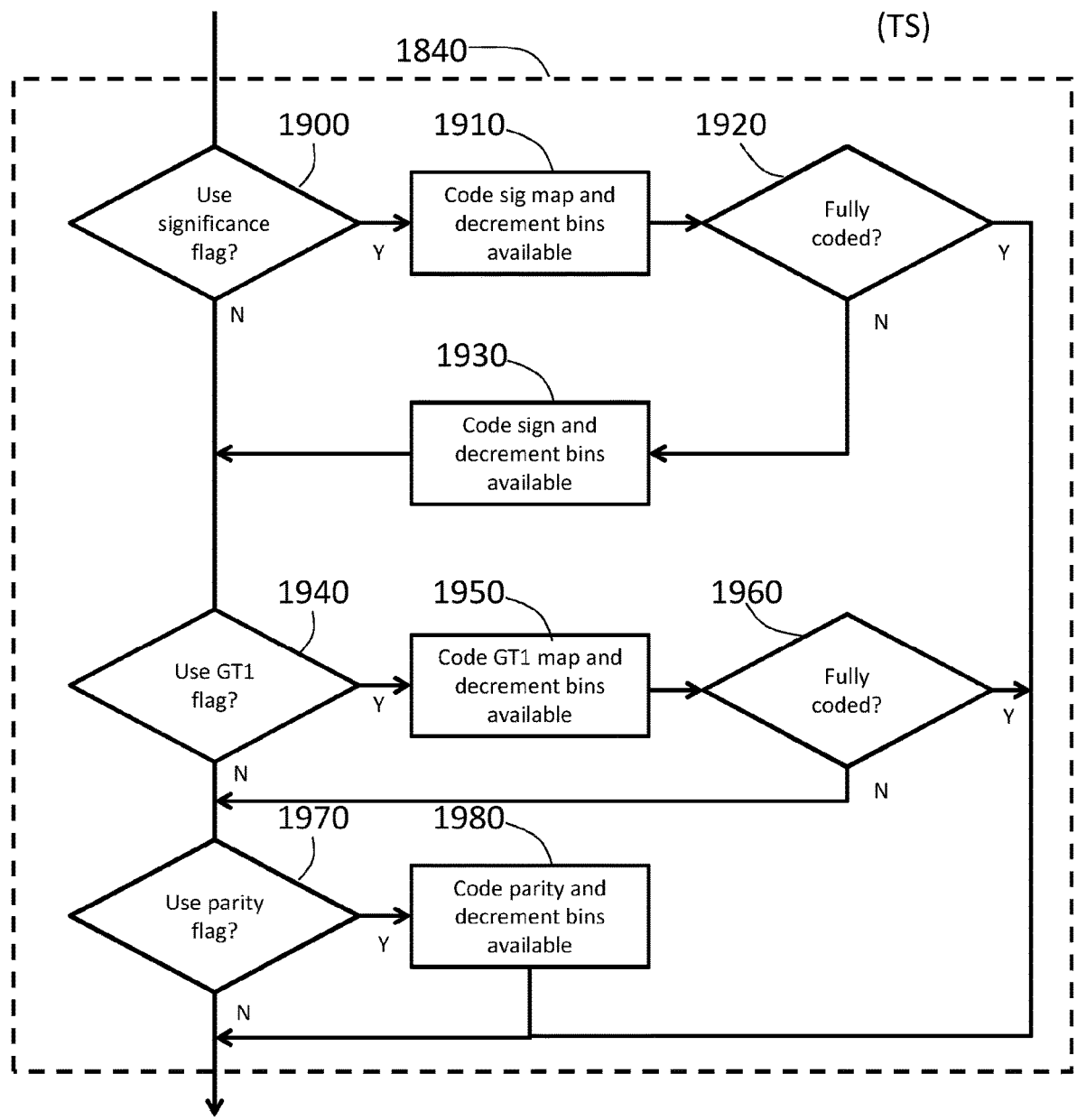
Figure 20:
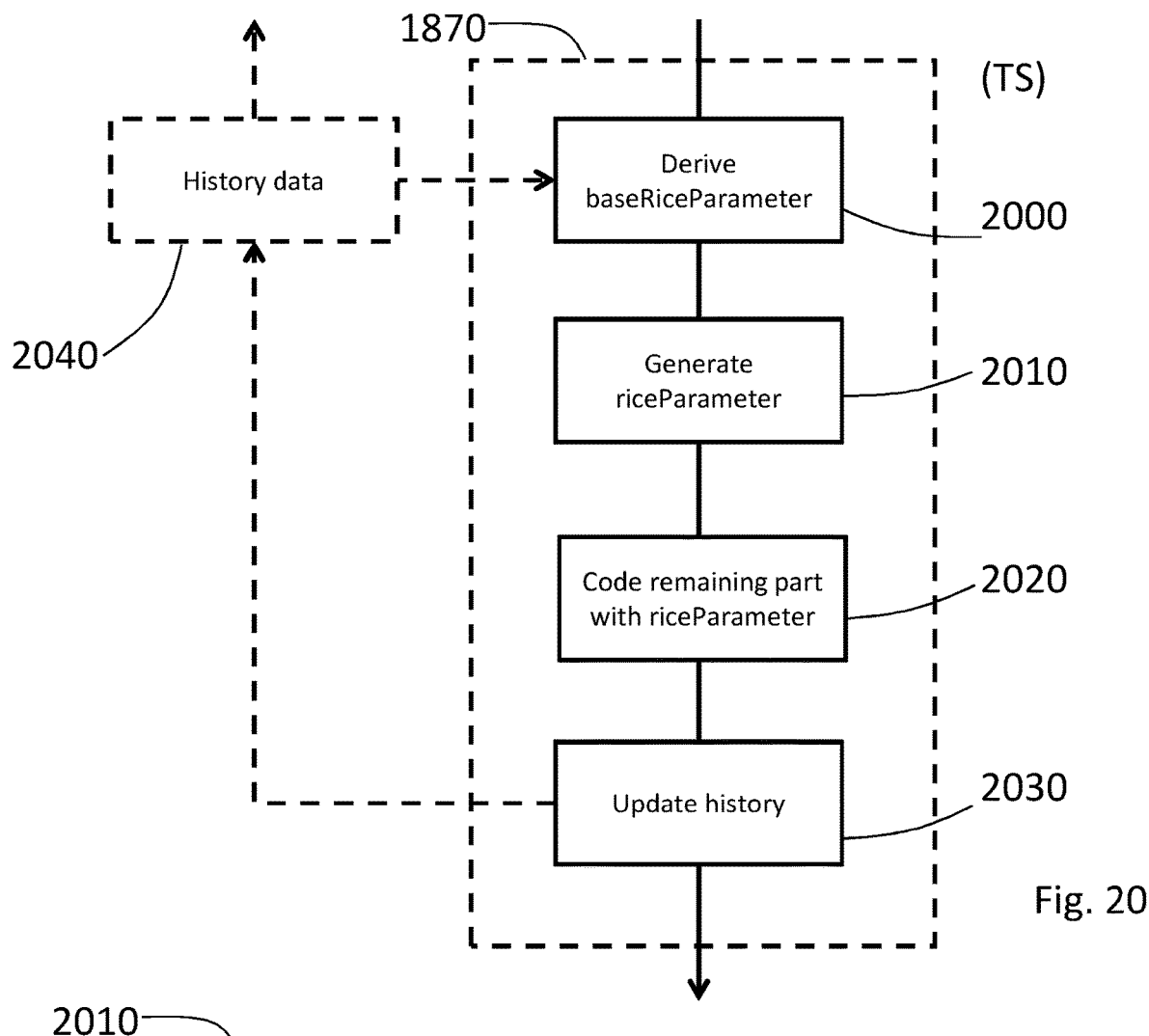
Figure 21:
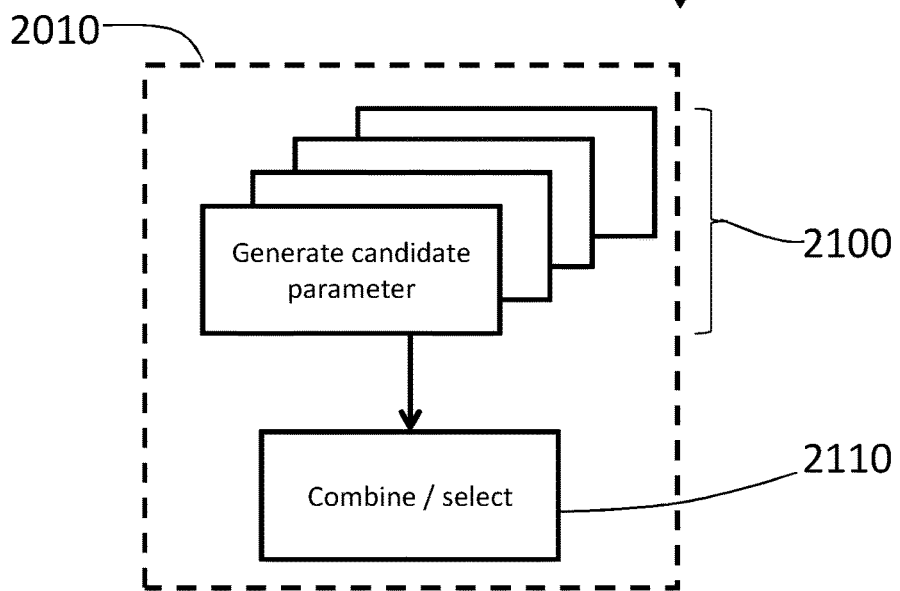

| FIGS. 14 and 18 | |
|---|---|
| 1400, 1410, 1420 | 1800, 1810, 1820 |
| 1430, 1490 | 1830, 1895 |
| 1450 | 1860 |
| FIGS. 15 and 19 | |
| 1500, 1510, 1520 | 1900, 1910, 1920 |
| 1530, 1540, 1550 | 1940, 1950, 1960 |
| 1580, 1590 | 1970, 1980 |
| FIGS. 16 and 20 | |
| 1640 | 2040 |
| 1600, 1620, 1630 | 2000, 2020, 2030 |
| FIGS. 17 and 21 | |
| 1710 | 2110 |

Difference 1—Sign Bits

Referring to FIG. 18, rather than the sign information being encoded as the negative outcome of a test as to whether more coefficient remain to encode (a step 1820 in FIG. 18) it is performed within the step 1840 as a step 1930 at the negative outcome of a step 1920. Therefore the negative outcome of the step 1820 is simply to end the process 1800 for that sub-TU.

Difference 2—GT2 Flags

The step 1810 not only determines which bins to use but also how many GT2 flags to use, which can be up to 4 in the case of TS processing. These are encoded at a step 1890 assuming that the number remaining (that is to say, not encoded so far in that sub-TU) of the original number allocated by the step 1810 is still greater than zero.

Similarly, referring to FIG. 19 regarding the step 1840, the negative outcome of the fully coded test 1920 provides for the coding of sign bits at a step 1930. The step 1840 does not concern coding GT2 flags as these are dealt with separately as discussed above.

The arrangement of FIG. 18 can be considered as comprising three sub-loops for each sub-TU or other block: a first sub-loop comprising the steps 1830, 1840, 1895; then a second sub-loop comprising the steps 1850, 1890; then a third sub-loop comprising the step 1870, with the sub-loops being executed in the order listed.

Difference 3—Default VVC Technique

In this example, the default VVC technique involves setting riceParameter=1.

Difference 4—Previously Encoded/Decoded Coefficients

In TS operation, the previously encoded/decoded coefficients used in the adaptive and local techniques to generate candidate Rice parameters are those shown lightly shaded in FIG. 10b surrounding the given coefficient 1000.

Alternative Examples not Requiring a Block Parameter

In the examples above (which relate to FIGS. 22 and 23 to be discussed below), a block parameter (blockParameter) was derived at the steps 1400, 1800 and used as the basis of determining which bins/flags to use and setting other parameters of encoding and decoding.

Other examples, however, do not require a block parameter in the same form, and instead the decision on which bins/flags to use can be made on a coefficient-by-coefficient basis, for example using similar techniques to those discussed in connection with the steps 1410, 1810 at with regard to a selected history data item or a combination or weighted combination of history data items addressed by the current coefficient position and other parameters, with a separate determination being made for other respective coefficients. Such examples may relate to FIGS. 24 and 25 discussed below.

In this way, in such a coefficient-by-coefficient arrangement, the choice of which bins/flags should be used for that coefficient can depend upon:

- a selection made by the step 1410/1810 in connection with that coefficient position; and
- whether there remain sufficient bins (1430/1830) to encode the selected bins/flags.

In other words, such an example coefficient-by-coefficient arrangement can be considered to provide the selection of bins/flags for CABAC encoding in dependence upon (at least) the two factors set out above.

(Note that in the case of the use of blockParameter discussed above, this is an arrangement in which a set of data sets is allocated to the block, so the question of whether bins are available is not relevant to that allocation at block level; however, for a coefficient by coefficient allocation, the availability of bins forms a second aspect of the allocation process).

Therefore, this provides an example of encoding 1440, 1840 a given data item by a first encoding technique (CABAC encoding of data sets in this example), the first encoding technique comprising encoding a series of zero or more data sets, each data set representing a respective range of values of the data items and selecting 1410, 1810 the series of data sets from a plurality of candidate data sets in dependence upon (i) a number of previously encoded data sets; and (ii) the history data applicable to a given property of the given data item. Here in the case of a coefficient by coefficient selection of bins, the dependency may be considered to be upon both the selection made at the step 1410, 1810 and the detection 1430, 1830 as to whether there remain enough bins available to encode a next coefficient. Corresponding techniques and decisions are performed at decoding as discussed above.

Summary Apparatus

The apparatus of FIG. 12, operating in accordance with the techniques described here, provides an example of apparatus for encoding successive data items, the apparatus comprising:

- a history data store 1260 configured to store history data for encoded data items, the history data indicating one or more aspects of encoding the encoded data items;
- first encoder circuitry 1210 configured to encode a given data item by a first encoding technique, the first encoding technique comprising encoding a series of zero or more data sets, each data set representing a respective range of values of the data items and selecting the series of data sets from a plurality of candidate data sets in dependence upon (i) a number of previously encoded data sets; and (ii) the history data applicable to a given property of the given data item; and
- second encoder circuitry 1230 configured to encode any remaining value of the given data item, the remaining value being an amount by which the given data item exceeds a maximum value which can be encoded by the first encoding technique, by a second encoding technique different to the first encoding technique.

The apparatus of FIG. 13, operating in accordance with the techniques described here, provides an example of apparatus for decoding an input data signal representing successive data items, the apparatus comprising:

- a history data store 1350 configured to store history data for decoded data items, the history data indicating one or more aspects of decoding the decoded data items;
- first decoder circuitry 1300 configured to decode a given data item by a first decoding technique, the first decoding technique comprising decoding a series of zero or more data sets, each data set representing a respective range of values of the data items and selecting the series of data sets from a plurality of candidate data sets in dependence upon (i) a number of previously decoded data sets; and (ii) the history data applicable to a given property of the given data item; and
- second decoder circuitry 1320 configured to decode any remaining value of the given data item, the remaining value being an amount by which the given data item exceeds a maximum value which can be decoded by the first decoding technique, by a second decoding technique different to the first decoding technique.

The apparatus of FIG. 12, operating in accordance with the techniques described here, provides an example of apparatus for encoding successive blocks of data items, the apparatus comprising:

- a history data store 1260 configured to store history data for encoded blocks of data items, the history data indicating one or more aspects of encoding the blocks of data items;
- generator circuitry 1250 configured to generate a block parameter in respect of a given block of data items, the block parameter depending at least in part upon history data applicable to the given block of data items;
- first encoder circuitry 1210 configured to encode a given data item of the given block of data items by a first encoding technique, the first encoding technique comprising encoding a series of zero or more data sets, each data set representing a respective range of values of the data items and selecting the series of data sets from a plurality of candidate data sets in dependence upon the block parameter generated for the given block of data items; and second encoder circuitry 1230 configured to encode any remaining value of the given data item, the remaining value being an amount by which the given data item exceeds a maximum value which can be encoded by the first encoding technique, by a second encoding technique different to the first encoding technique.

The apparatus of FIG. 13, operating in accordance with the techniques described here, provides an example of apparatus for decoding successive blocks of data items, the apparatus comprising:

a history data store 1350 configured to store history data for decoded blocks of data items, the history data indicating one or more aspects of decoding the blocks of data items;

generator circuitry 1340 configured to generate a block parameter in respect of a given block of data items, the block parameter depending at least in part upon history data applicable to the given block of data items;

first decoder circuitry 1300 configured to decode a given data item of the given block of data items by a first decoding technique, the first decoding technique comprising decoding a series of zero or more data sets, each data set representing a respective range of values of the data items and selecting the series of data sets from a plurality of candidate data sets in dependence upon the block parameter generated for the given block of data items; and second decoder circuitry 1320 configured to decode any remaining value of the given data item, the remaining value being an amount by which the given data item exceeds a maximum value which can be decoded by the first decoding technique, by a second encoding technique different to the first decoding technique.

It is noted that although FIGS. 12 and 13 refer to the encoding circuitry and the decoding circuitry as two respective units in each case, the first and second circuitries in each instance could be implemented as a single common circuitry having both respective functions.

Use of Copied History Data

Figure 26:
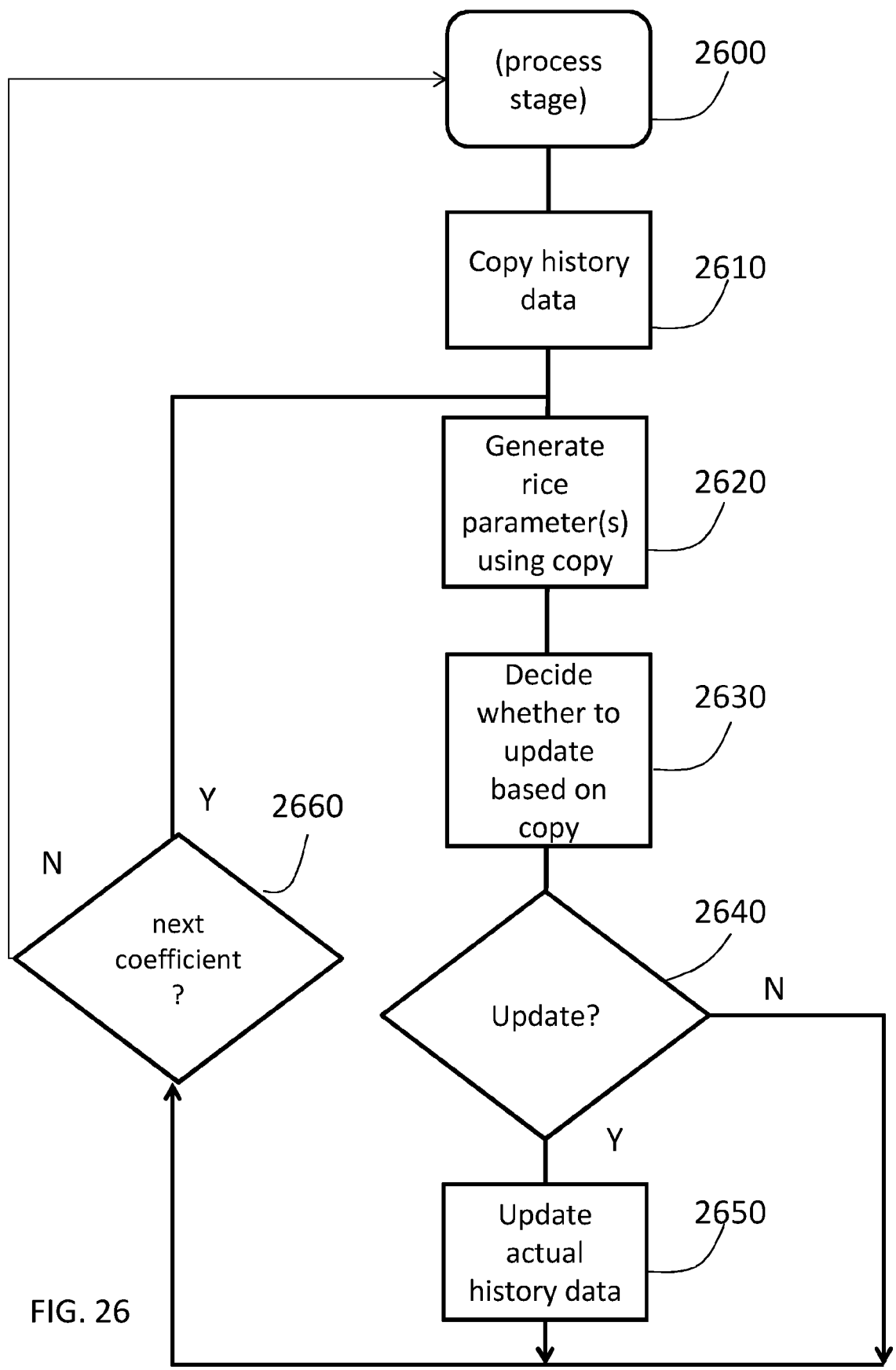

As a variation of the techniques discussed above and below (and useable in combination with any permutation of them), example arrangements can make at least some use of a copy of the history data. This can allow a greater extent of parallel operation for example. An example will be discussed with reference to the flowchart of FIG. 26.

In summary of this technique, at the start of a particular process stage 2600 (such as the beginning of processing each TU or sub-TU, or alternatively at the start of processing each coefficient) a copy is taken (at a step 2610) of all of the history data, or at least the history data relevant to the processing to be conducted in connection with that process stage. Processing is conducted using the copied history data, such as the processing associated with FIG. 16 discussed above including generating rice parameters (at a step 2620) and making a decision (at a step 2630) as to whether the history data should be updated.

If (at a step 2640) the history data is indeed to be updated using the update procedures discussed above, then the update is applied at a step 2650 to the actual history data rather than to the copy. Once the update has been processed, or if no update is required (the negative outcome of the step 2640) then if the current processing stage requires processing for a next coefficient at a step 2660 then this is initiated by passing control to the step 2620 again. If not then control returns to handling of the next process stage at the step 2600.

This arrangement provides an example of generating a copy of at least portions of the stored history data applicable to the given property of the given data item;

deriving the second portion size at least in part in dependence upon the copy of the history data applicable to the given property of the given data item (though other actions dependent upon the history data could also or instead be taken dependent upon the copy rather than the "live" data; in fact the copied data could be used anywhere in the present discussions, other than for example the process of actually updating of the stored history data, that the "non-copied" or original history data is described as being used); and modifying at least the stored history data applicable to the given property of the given data item in response to encoding of the given data item.

Templates and Template Functions

As a variation of the techniques discussed above (and useable in combination with any permutation of them), example arrangements can use a template function or representation as part of an indexing process into a multi-dimensional array of history data.

Various approaches will now be discussed with reference to template representations illustrated in FIGS. 27a to 35 which provide options for replacing the "Manhattan distance from top left" mentioned above with other functions of coefficient and/or sub-block position. Here, a key is provided to illustrate index values riceIdx between 0 and 3. The riceIdx value is used as a parameter or index to access one dimension of the multi-dimensional array of history data discussed above. These provide examples in which a dependence (via riceIdx) on the history data to be used is introduced or handled according to one or more of:

position of the given image data value in an image;

position of the given image data value in a block of image data values containing the given image data value;

position of a block of image data values containing the given image data value in an image;

position of a sub-block of image data values containing the given image data value within a block of image data values;

The examples shown in FIGS. 27a to 35 schematically illustrate a 16×16 TU, drawn as a 4×4 array of 4×4 sub-TUs. If a different size TU is used then the same derivations can be utilised for coefficient positions within that TU.

Figures 27A, 27B:
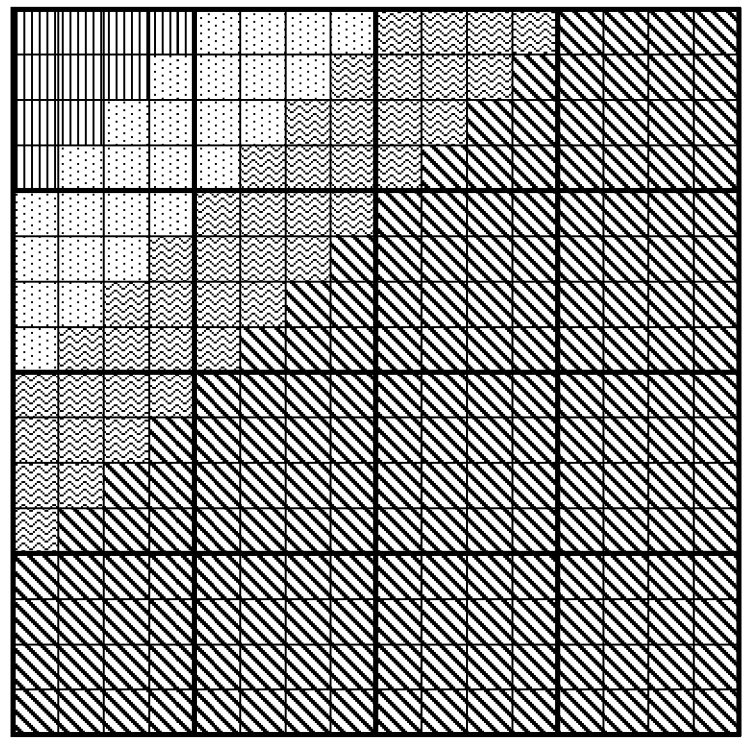
FIGS. 27a, 27b, 28, 29, 30a, 30b, 31, 32a, 32b, 33, 34a, 34b and 35 schematically illustrate the use of templates.

FIG. 27a schematically illustrates both the Manhattan distance approach discussed above, and another approach which can provide equivalent results.

In the case of the Manhattan distance approach:

riceIdx=min((posX+posY)>>2,3)

In the case of the following functions, referred to as a template with clipping, the same results are obtained:

riceIdx=min(template(scanPos−minPos)+cgPosX+cgPosY,3)

Here, scanPos is a position in a scan order in the sub-block; minPos is the minimum scanPos in the sub-block; cgPosX and cgPosY are sub-block X and Y positions (from (0,0) for a top left sub-block to (3,3) for a lower right sub-block)—in other words these are constant for a given sub-block. The "template" represents the data values in a 4×4 array as shown schematically in FIG. 27b.

Figure 28:
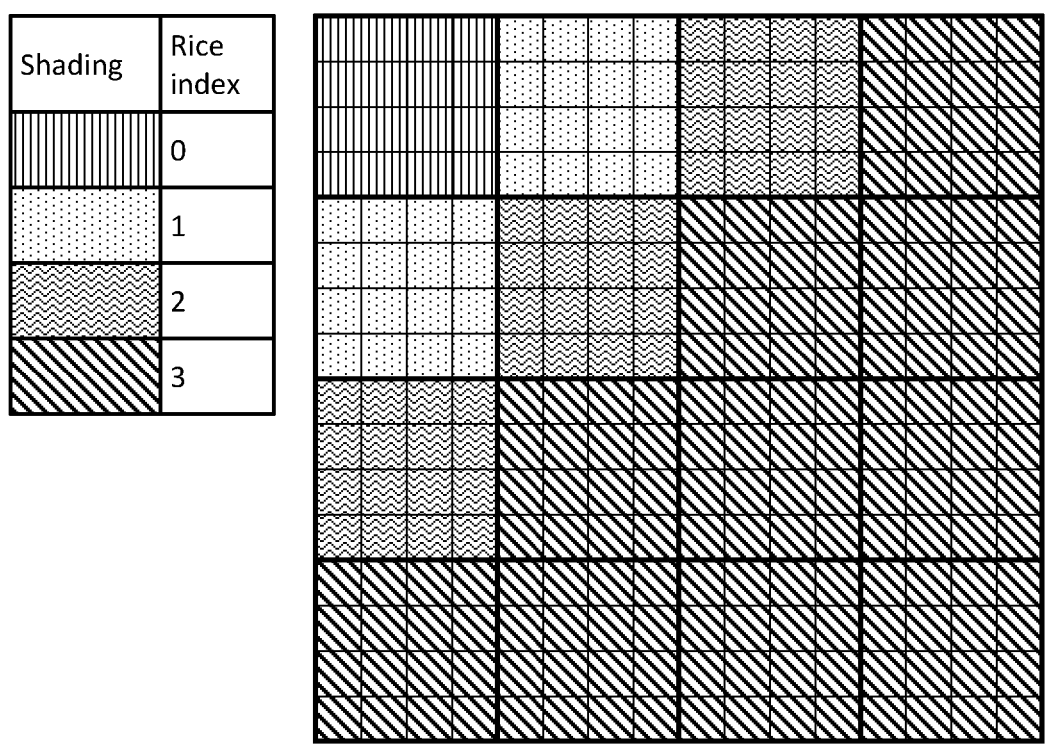

Another possible approach is shown schematically in FIG. 28, referring to the Manhattan distance from top left of a sub-TU or sub-block. Here:

riceIdx=min(cgPosX+cgPosY,3)

Figures 29, 30A, 30B:
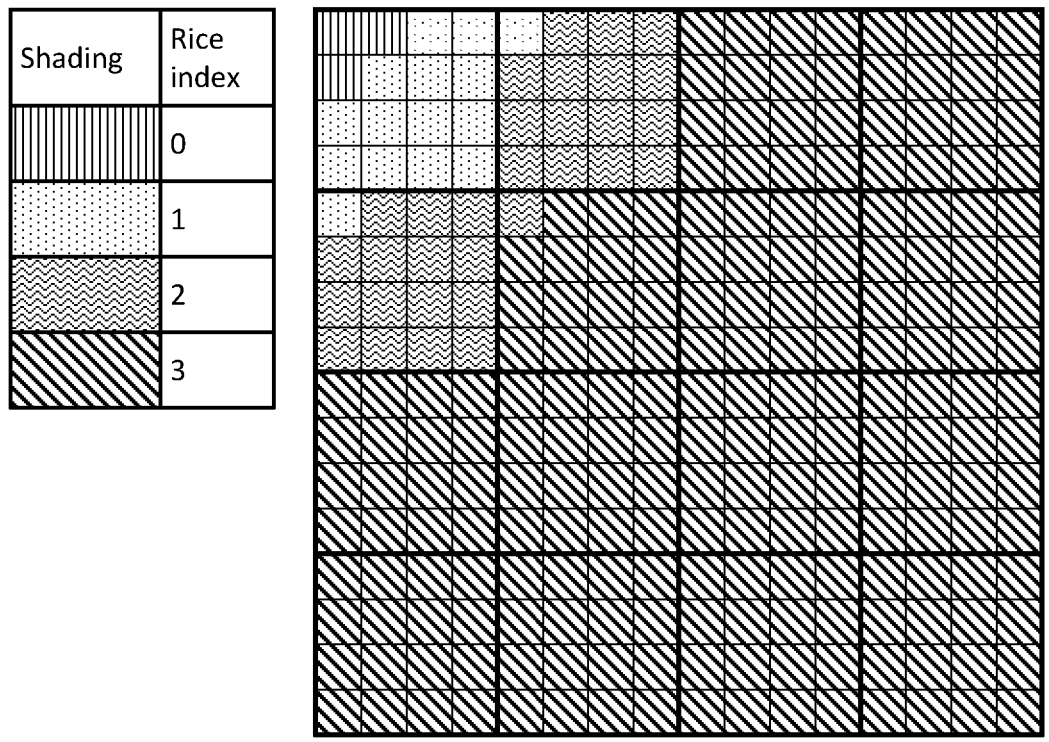

The arrangement of FIG. 29 uses multiple (for example two) different template arrays as shown schematically in FIGS. 30a and 30b. Here the template array of FIG. 30a is used for the top left sub-block (cgPosX, cgPosY)=(0,0) and the template array of FIG. 30b is used for all other sub-blocks.

riceIdx=min(template$_i$(scanPos-minPos)+cgPosX+cgPosY,3)

where template$_i$ refers to the selected template array discussed above.

Figures 31, 32A, 32B:
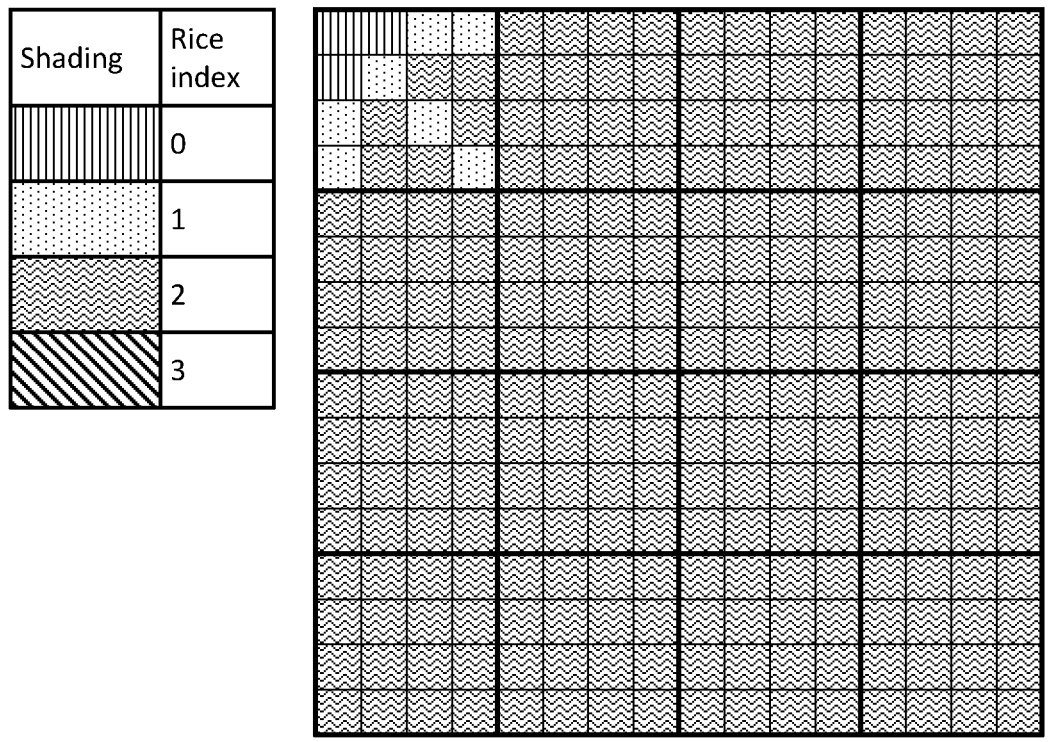

A similar arrangement is used in FIG. 31 in that multiple templates are used (two in this example) but the template (FIG. 32b) for all except the top left sub-block is all of a single value, in contrast to the template (FIG. 32a) for the top left sub-block which exhibits a variation between coefficient positions. Here:

riceIdx=(template(scanPos−minPos)+cgPosX+cgPosY,3)

for the top-left (though note that (cgPosX+cgPosY)=0 for this sub-block so it is possible to use riceIdx=template(scanPos-minPos) for this sub-block)

riceIdx=min(1+cgPosX+cgPosY,3)

for others

Figures 33, 34A, 34B:
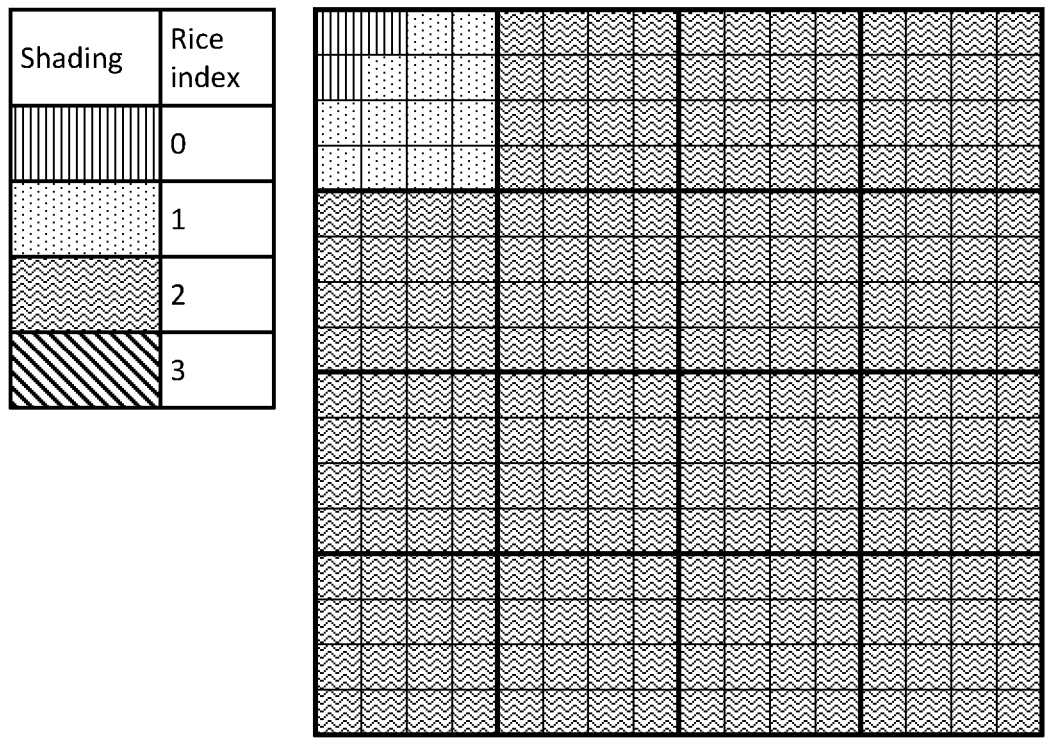
Figure 35:
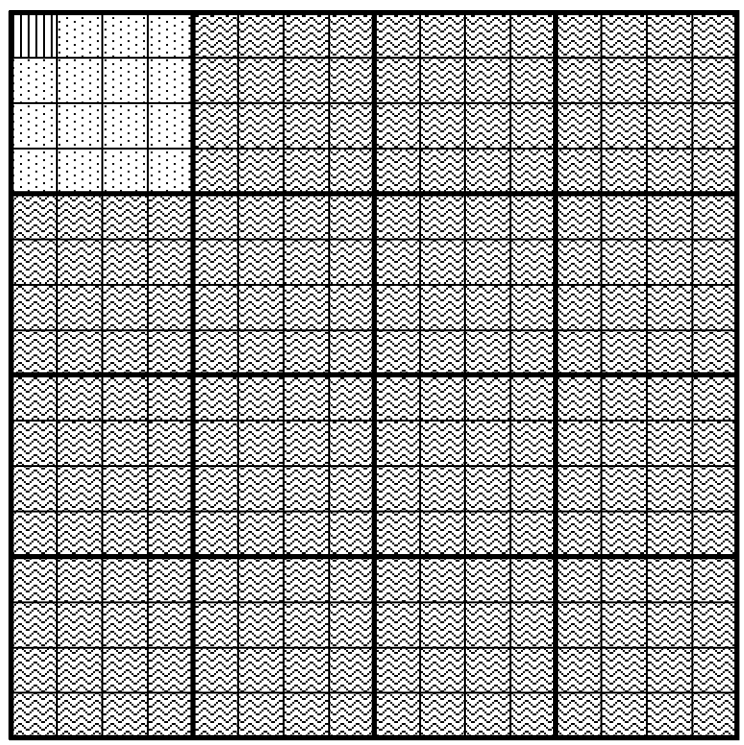

FIG. 33 schematically illustrates another variation of the same arrangement, with a different "top left" template (FIG. 34a) but the same "others" template (FIG. 34b).

A final example approach (FIG. 35) is as follows:

The "dc" coefficient (top left of the top left sub-block) is set to one riceIdx value (0 in this example); the remainder of the top left sub-block is set to another riceIdx value (1 in this example) and all other coefficient positions are set to a further riceIdx value (2 in this example).

In summary of these riceIdx techniques, the approach set out above involved (for example) generating an index based on a potentially scaled Manhattan distance of a given coefficient from the top left of the TU, but alternatives can include using:

Template+Manhattan position of sub-TU
Manhattan distance of sub-TU in TU
Different templates for top-left sub-TU and other sub-TU
Top-left sub-TU template only (otherwise constant value)
DC/top-left sub-TU (otherwise constant value)

Note that clipping to a minimum or maximum value may be required as discussed above for some of these options.

Summary Methods

Figure 22:
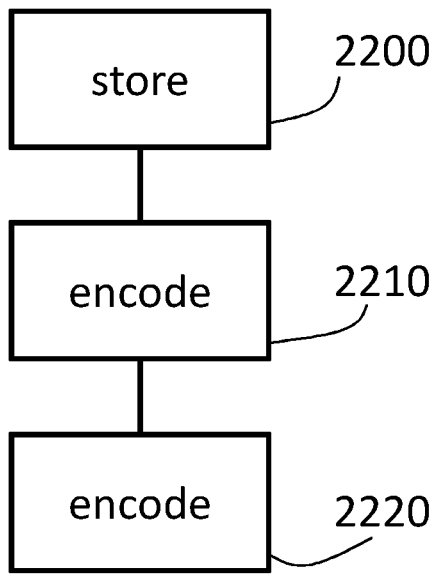

FIG. 22 is a schematic flowchart illustrating a method of encoding successive data items, the method comprising:

storing (at a step 2200) history data for encoded data items, the history data indicating one or more aspects of encoding the encoded data items;

encoding (at a step 2210) a given data item by a first encoding technique, the first encoding technique comprising encoding a series of zero or more data sets, each data set representing a respective range of values of the data items and selecting the series of data sets from a plurality of candidate data sets in dependence upon (i) a number of previously encoded data sets; and (ii) the history data applicable to a given property of the given data item; and encoding (at a step 2220) any remaining value of the given data item, the remaining value being an amount by which the given data item exceeds a maximum value which can be encoded by the first encoding technique, by a second encoding technique different to the first encoding technique.

Figure 23:
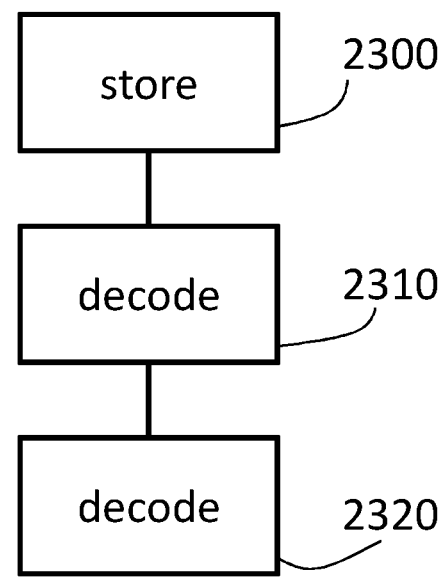

FIG. 23 is a schematic flowchart illustrating a method of decoding an input data signal representing successive data items, the method comprising:

storing (at a step 2300) history data for decoded data items, the history data indicating one or more aspects of decoding the decoded data items;

decoding (at a step 2310) a given data item by a first decoding technique, the first decoding technique comprising decoding a series of zero or more data sets, each data set representing a respective range of values of the data items and selecting the series of data sets from a plurality of candidate data sets in dependence upon (i) a number of previously decoded data sets; and (ii) the history data applicable to a given property of the given data item; and decoding (at a step 2320) any remaining value of the given data item, the remaining value being an amount by which the given data item exceeds a maximum value which can be decoded by the first decoding technique, by a second decoding technique different to the first decoding technique.

Figure 24:
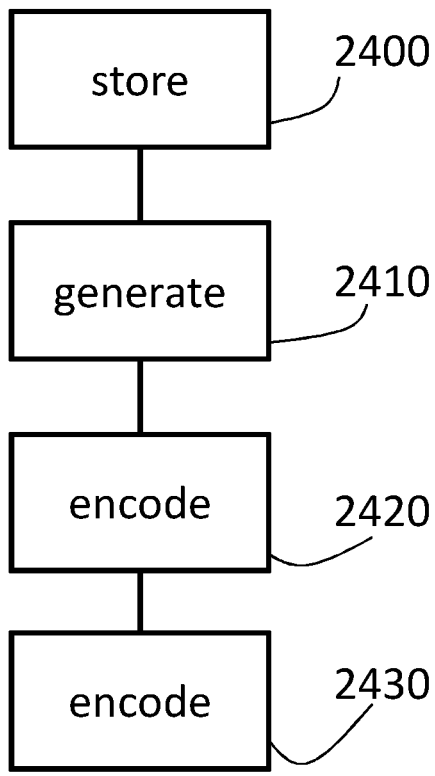

FIG. 24 is a schematic flowchart illustrating a method of encoding successive blocks of data items, the method comprising:

storing (at a step 2400) history data for encoded blocks of data items, the history data indicating one or more aspects of encoding the blocks of data items;

generating (at a step 2410) a block parameter in respect of a given block of data items, the block parameter depending at least in part upon history data applicable to the given block of data items;

encoding (at a step 2420) a given data item of the given block of data items by a first encoding technique, the first encoding technique comprising encoding a series of zero or more data sets, each data set representing a respective range of values of the data items and selecting the series of data sets from a plurality of candidate data sets in dependence upon the block parameter generated for the given block of data items; and encoding (at a step 2430) any remaining value of the given data item, the remaining value being an amount by which the given data item exceeds a maximum value which can be encoded by the first encoding technique, by a second encoding technique different to the first encoding technique.

Figure 25:
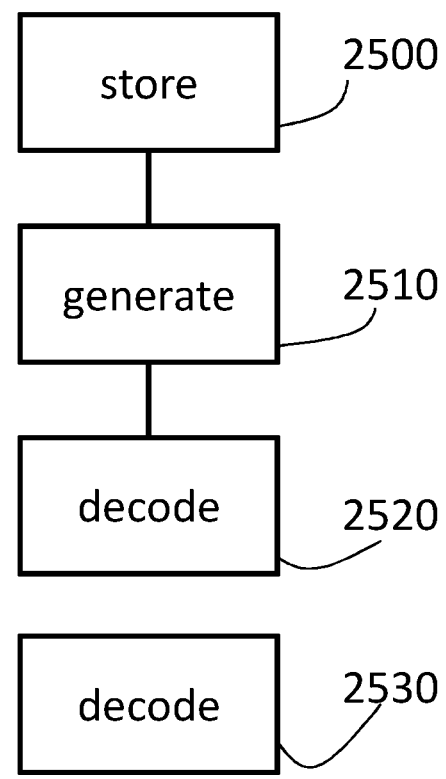

FIG. 25 is a schematic flowchart illustrating a method of decoding successive blocks of data items, the method comprising:

storing (at a step 2500) history data for decoded blocks of data items, the history data indicating one or more aspects of decoding the blocks of data items;

generating (at a step 2510) a block parameter in respect of a given block of data items, the block parameter depending at least in part upon history data applicable to the given block of data items;

decoding (at a step 2520) a given data item of the given block of data items by a first decoding technique, the first decoding technique comprising decoding a series of zero or more data sets, each data set representing a respective range of values of the data items and selecting the series of data sets from a plurality of candidate data sets in dependence upon the block parameter generated for the given block of data items; and decoding (at a step 2530) any remaining value of the given data item, the remaining value being an amount by which the given data item exceeds a maximum value which can be decoded by the first decoding technique, by a second encoding technique different to the first decoding technique.

Any one or more of the above encoding methods may be implemented by the apparatus of FIGS. 7 and/or 8 and/or 12.

Any one or more of the above decoding methods may be implemented by the apparatus of FIGS. 7 and/or 8 and/or 13.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments. Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Respective aspects and features are defined by the following numbered clauses:

1. A method of encoding successive data items, the method comprising:
    storing history data for encoded data items, the history data indicating one or more aspects of encoding the encoded data items;
    encoding a given data item by a first encoding technique, the first encoding technique comprising encoding a series of zero or more data sets, each data set representing a respective range of values of the data items and selecting the series of data sets from a plurality of candidate data sets in dependence upon (i) a number of previously encoded data sets; and (ii) the history data applicable to a given property of the given data item; and
    encoding any remaining value of the given data item, the remaining value being an amount by which the given data item exceeds a maximum value which can be encoded by the first encoding technique, by a second encoding technique different to the first encoding technique.
2. The method of clause 1, in which the second encoding technique comprises encoding an escape code comprising a first portion and a non-unary coded second portion having a length, in bits, dependent upon a second portion size.
3. The method of clause 2, comprising deriving the second portion size at least in part in dependence upon the history data applicable to the given property of the given data item.
4. The method of clause 3, comprising generating a plurality of candidate second portion sizes and selecting amongst the plurality of candidate second portion sizes in dependence upon the history data applicable to the given property of the given data item.
5. The method of clause 4, in which the generating step comprises, for at least one candidate second portion size, obtaining that candidate second portion size by accessing a look-up table according to an index dependent upon at least one previously encoded data item.
6. The method of clause 5, in which the generating step comprises selectively applying a shift amount dependent upon at least the history data.
7. The method of clause 6, in which the applying step comprises one of:
    (i) applying a right-shift in derivation of the index, the right shift being dependent upon the shift amount; and
    (ii) adding the shift amount in derivation of the index.
8. The method of clause 7, in which the generating step comprises combining a value accessed from the look-up table with a value dependent upon the shift amount.
9. The method of clause 8, in which the generating step comprises adding the value accessed from the look-up table to the shift amount.
10. The method of any one of the preceding clauses, in which the candidate data sets comprise one or more data sets selected from the list consisting of:
    a significance data set indicating whether a data item is non-zero;
    one or more greater-than-n data sets indicating whether a given data item is greater than a respective value of n;
    a parity data set indicating a value of a least significant bit of a data item.
11. The method of clause 10, in which, when one or more data sets are selected, encoding by the first technique comprises modifying the data value after encoding by a given data set to account for values which can be encoded by that data set.
12. The method of clause 11, in which, when two or more data sets are selected, encoding by the first technique comprises encoding by the two or more data sets in a predetermined data set order.
13. The method of any one of the preceding clauses, in which the storing step comprises modifying at least the stored history data applicable to the given property of the given data item in response to encoding of the given data item.

14. The method of clause 3, in which the deriving step comprises:
generating a copy of at least portions of the stored history data applicable to the given property of the given data item;
deriving the second portion size at least in part in dependence upon the copy of the history data applicable to the given property of the given data item; and
modifying at least the stored history data applicable to the given property of the given data item in response to encoding of the given data item.

15. The method of clause 13 or clause 14, in which the modifying step comprises selectively modifying at least the stored history data applicable to the given property of the given data item in response to encoding of the given data item, only when the given data item exceeds a threshold absolute value.

16. The method of any one of the preceding clauses, in which the history data comprises data indicative of a plurality of data item properties.

17. The method of clause 16, in which the data items are image data values, and the plurality of data item properties for a given image data value comprise two or more properties selected from the list consisting of:
colour component represented by the given image data value;
block size of a block of data values containing the given image data value;
position of the given image data value in an image;
position of the given image data value in a block of image data values containing the given image data value;
position of a block of image data values containing the given image data value in an image;
position of a sub-block of image data values containing the given image data value within a block of image data values;
block size of a block of image data values containing the given image data value;
distance of the given image data value from a predetermined location in a block of image data values containing the given image data value; and
whether or not the given image data value is generated using a spatial frequency transform.

18. The method of any one of the preceding clauses, in which the one or more aspects of encoding the encoded data items comprise one or more aspects indicative of a magnitude of the encoded data items.

19. The method of clause 18, in which the one or more aspects of encoding the encoded data items comprise data dependent upon a second portion size generated to encode the encoded data items.

20. Computer software which, when executed by a computer, causes the computer to perform the method of any one of the preceding clauses.

21. A non-transitory machine-readable storage medium which stores the computer software of clause 20.

22. An encoded data signal generated by the method of any one of any one of clauses 1 to 19.

23. A non-transitory machine-readable storage medium which stores the encoded data signal of clause 22.

24. A method of decoding an input data signal representing successive data items, the method comprising:
storing history data for decoded data items, the history data indicating one or more aspects of decoding the decoded data items;
decoding a given data item by a first decoding technique, the first decoding technique comprising decoding a series of zero or more data sets, each data set representing a respective range of values of the data items and selecting the series of data sets from a plurality of candidate data sets in dependence upon (i) a number of previously decoded data sets; and (ii) the history data applicable to a given property of the given data item; and
decoding any remaining value of the given data item, the remaining value being an amount by which the given data item exceeds a maximum value which can be decoded by the first decoding technique, by a second decoding technique different to the first decoding technique.

25. The method of clause 24, in which the second decoding technique comprises decoding an escape code comprising a first portion and a non-unary coded second portion having a length, in bits, dependent upon a second portion size.

26. The method of clause 25, comprising deriving the second portion size at least in part in dependence upon the history data applicable to the given property of the given data item.

27. The method of clause 26, comprising generating a plurality of candidate second portion sizes and selecting amongst the plurality of candidate second portion sizes in dependence upon the history data applicable to the given property of the given data item.

28. The method of clause 27, in which the generating step comprises, for at least one candidate second portion size, obtaining that candidate second portion size by accessing a look-up table according to an index dependent upon at least one previously encoded data item.

29. The method of clause 28, in which the generating step comprises selectively applying a shift amount dependent upon at least the history data.

30. The method of clause 29, in which the applying step comprises one of:
(i) applying a right-shift in derivation of the index, the right shift being dependent upon the shift amount; and
(ii) adding the shift amount in derivation of the index.

31. The method of clause 30, in which the generating step comprises combining a value accessed from the look-up table with a value dependent upon the shift amount.

32. The method of clause 31, in which the generating step comprises adding the value accessed from the look-up table to the shift amount.

33. The method of clause 27, in which the step of generating the plurality of candidate second portion sizes comprises, for at least one candidate second portion size, applying a shift amount dependent upon the value of one or more of the data items.

34. The method of any one of clauses 24 to 33, in which the candidate data sets comprise one or more data sets selected from the list consisting of:
a significance data set indicating whether a data item is non-zero;
one or more greater-than-n data sets indicating whether a given data item is greater than a respective value of n;
a parity data set indicating a value of a least significant bit of a data item.

35. The method of clause 34, in which, when one or more data sets are selected, decoding by the first technique comprises modifying the data value after decoding by a given data set to account for values which can be decoded by that data set.

36. The method of clause 35, in which, when two or more data sets are selected, decoding by the first technique comprises decoding by the two or more data sets in a predetermined data set order.

37. The method of any one of clauses 24 to 36, in which the storing step comprises modifying at least the stored history data applicable to the given property of the given data item in response to decoding of the given data item.

38. The method of clause 26, in which the deriving step comprises:
   generating a copy of at least portions of the stored history data applicable to the given property of the given data item;
   deriving the second portion size at least in part in dependence upon the copy of the history data applicable to the given property of the given data item; and
   modifying at least the stored history data applicable to the given property of the given data item in response to encoding of the given data item.

39. The method of clause 37, in which the modifying step comprises selectively modifying at least the stored history data applicable to the given property of the given data item in response to encoding of the given data item, only when the given data item exceeds a threshold absolute value.

40. The method of any one of clauses 24 to 39, in which the history data comprises data indicative of a plurality of data item properties.

41. The method of clause 40, in which the data items are image data values, and the plurality of data item properties for a given image data value comprise two or more properties selected from the list consisting of:
   colour component represented by the given image data value;
   block size of a block of data values containing the given image data value;
   position of the given image data value in an image;
   position of the given image data value in a block of image data values containing the given image data value;
   position of a block of image data values containing the given image data value in an image;
   position of a sub-block of image data values containing the given image data value within a block of image data values;
   block size of a block of image data values containing the given image data value;
   distance of the given image data value from a predetermined location in a block of image data values containing the given image data value; and
   whether or not the given image data value is generated using a spatial frequency transform.

42. The method of any one of clauses 24 to 41, in which the one or more aspects of decoding the decoded data items comprise one or more aspects indicative of a magnitude of the decoded data items.

43. The method of clause 42, in which the one or more aspects of decoding the decoded data items comprise data dependent upon a second portion size generated to decode the decoded data items.

44. Computer software which, when executed by a computer, causes the computer to perform the method of any one of clauses 24 to 43.

45. A non-transitory machine-readable storage medium which stores the computer software of clause 44.

46. Apparatus for encoding successive data items, the apparatus comprising:
   a history data store configured to store history data for encoded data items, the history data indicating one or more aspects of encoding the encoded data items;
   first encoder circuitry configured to encode a given data item by a first encoding technique, the first encoding technique comprising encoding a series of zero or more data sets, each data set representing a respective range of values of the data items and selecting the series of data sets from a plurality of candidate data sets in dependence upon (i) a number of previously encoded data sets; and (ii) the history data applicable to a given property of the given data item; and
   second encoder circuitry configured to encode any remaining value of the given data item, the remaining value being an amount by which the given data item exceeds a maximum value which can be encoded by the first encoding technique, by a second encoding technique different to the first encoding technique.

47. Video data capture, transmission, display and/or storage apparatus comprising the apparatus of clause 46.

48. Apparatus for decoding an input data signal representing successive data items, the apparatus comprising:
   a history data store configured to store history data for decoded data items, the history data indicating one or more aspects of decoding the decoded data items;
   first decoder circuitry configured to decode a given data item by a first decoding technique, the first decoding technique comprising decoding a series of zero or more data sets, each data set representing a respective range of values of the data items and selecting the series of data sets from a plurality of candidate data sets in dependence upon (i) a number of previously decoded data sets; and (ii) the history data applicable to a given property of the given data item; and
   second decoder circuitry configured to decode any remaining value of the given data item, the remaining value being an amount by which the given data item exceeds a maximum value which can be decoded by the first decoding technique, by a second decoding technique different to the first decoding technique.

49. Video data capture, transmission, display and/or storage apparatus comprising the apparatus of clause 48.

50. A method of encoding successive blocks of data items, the method comprising:
   storing history data for encoded blocks of data items, the history data indicating one or more aspects of encoding the blocks of data items;
   generating a block parameter in respect of a given block of data items, the block parameter depending at least in part upon history data applicable to the given block of data items;
   encoding a given data item of the given block of data items by a first encoding technique, the first encoding technique comprising encoding a series of zero or more data sets, each data set representing a respective range of values of the data items and selecting the series of data sets from a plurality of candidate data sets in dependence upon the block parameter generated for the given block of data items; and encoding any remaining value of the given data item, the remaining value being an amount by which the given data item exceeds a maximum value which can be encoded by the first encoding technique, by a second encoding technique different to the first encoding technique.

51. The method of clause 50, in which the second encoding technique comprises encoding an escape code comprising a first portion and a non-unary coded second portion having a length, in bits, dependent upon a second portion size.

52. The method of clause 51, comprising deriving the second portion size at least in part in dependence upon the history data applicable to the given block of data items.

53. The method of clause 52, comprising generating a plurality of candidate second portion sizes and selecting amongst the plurality of candidate second portion sizes in dependence upon the history data applicable to the given property of the given data item.

54. The method of clause 53, in which the step of generating the plurality of candidate second portion sizes comprises, for at least one candidate second portion size, applying a shift amount dependent upon the value of one or more of the data items.

55. The method of any one of clauses 50 to 54, in which the candidate data sets comprise one or more data sets selected from the list consisting of:
a significance data set indicating whether a data item is non-zero;
one or more greater-than-n data sets indicating whether a given data item is greater than a respective value of n;
a parity data set indicating a value of a least significant bit of a data item.

56. The method of clause 55, in which, when one or more data sets are selected, encoding by the first technique comprises modifying the data value after encoding by a given data set to account for values which can be encoded by that data set.

57. The method of clause 56, in which, when two or more data sets are selected, encoding by the first technique comprises encoding by the two or more data sets in a predetermined data set order.

58. The method of any one of clauses 50 to 57, in which the storing step comprises modifying at least the stored history data applicable to the given block of data items in response to encoding of the given block of data items.

59. The method of clause 52, in which the deriving step comprises:
generating a copy of at least portions of the stored history data applicable to the given property of the given data item;
deriving the second portion size at least in part in dependence upon the copy of the history data applicable to the given property of the given data item; and
modifying at least the stored history data applicable to the given property of the given data item in response to encoding of the given data item.

60. The method of clause 58 or clause 59, in which the modifying step comprises selectively modifying at least the stored history data applicable to the given property of the given data item in response to encoding of the given data item, only when the given data item exceeds a threshold absolute value.

61. The method of any one of clauses 50 to 60, in which the storing step comprises storing history data applicable to a plurality of data item properties.

62. The method of clause 61, in which the data items are image data values, and the history data for a given block of data items containing a given image data value comprises two or more properties selected from the list consisting of:
colour component represented by the given image data value;
block size of a block of data values containing the given image data value;
position of the given image data value in an image;
position of the given image data value in a block of image data values containing the given image data value;
position of a block of image data values containing the given image data value in an image;
position of a sub-block of image data values containing the given image data value within a block of image data values;
block size of a block of image data values containing the given image data value;
distance of the given image data value from a predetermined location in a block of image data values containing the given image data value; and
whether or not the given image data value is generated using a spatial frequency transform.

63. The method of any one of clauses 50 to 62, in which the one or more aspects of encoding the encoded data items comprise one or more aspects indicative of a magnitude of the encoded data items.

64. The method of clause 63, in which the one or more aspects of encoding the encoded data items comprise data dependent upon a second portion size generated to encode the encoded data items.

65. Computer software which, when executed by a computer, causes the computer to perform the method of any one of clauses 50 to 64.

66. A non-transitory machine-readable storage medium which stores the computer software of clause 65.

67. An encoded data signal generated by the method of any one of clauses 50 to 64.

68. A non-transitory machine-readable storage medium which stores the encoded data signal of clause 67.

69. A method of decoding successive blocks of data items, the method comprising:
storing history data for decoded blocks of data items, the history data indicating one or more aspects of decoding the blocks of data items;
generating a block parameter in respect of a given block of data items, the block parameter depending at least in part upon history data applicable to the given block of data items;
decoding a given data item of the given block of data items by a first decoding technique, the first decoding technique comprising decoding a series of zero or more data sets, each data set representing a respective range of values of the data items and selecting the series of data sets from a plurality of candidate data sets in dependence upon the block parameter generated for the given block of data items; and decoding any remaining value of the given data item, the remaining value being an amount by which the given data item exceeds a maximum value which can be decoded by the first decoding technique, by a second encoding technique different to the first decoding technique.

70. The method of clause 69, in which the second decoding technique comprises decoding an escape code comprising a first portion and a non-unary coded second portion having a length, in bits, dependent upon a second portion size.

71. The method of clause 70, comprising deriving the second portion size at least in part in dependence upon the history data applicable to the given block of data items.

72. The method of clause 71, comprising generating a plurality of candidate second portion sizes and selecting amongst the plurality of candidate second portion sizes in dependence upon the history data applicable to the given property of the given data item.

73. The method of clause 72, in which the step of generating the plurality of candidate second portion sizes comprises, for at least one candidate second portion size, applying a shift amount dependent upon the value of one or more of the data items.

74. The method of any one of clauses 69 to 73, in which the candidate data sets comprise one or more data sets selected from the list consisting of:
a significance data set indicating whether a data item is non-zero;
one or more greater-than-n data sets indicating whether a given data item is greater than a respective value of n;
a parity data set indicating a value of a least significant bit of a data item.

75. The method of clause 74, in which, when one or more data sets are selected, decoding by the first technique comprises modifying the data value after decoding by a given data set to account for values which can be decoded by that data set.

76. The method of clause 75, in which, when two or more data sets are selected, decoding by the first technique comprises decoding by the two or more data sets in a predetermined data set order.

77. The method of any one of clauses 69 to 76, in which the storing step comprises modifying at least the stored history data applicable to the given block of data items in response to decoding of the given block of data items.

78. The method of clause 71, in which the deriving step comprises:
generating a copy of at least portions of the stored history data applicable to the given property of the given data item;
deriving the second portion size at least in part in dependence upon the copy of the history data applicable to the given property of the given data item; and
modifying at least the stored history data applicable to the given property of the given data item in response to encoding of the given data item.

79. The method of clause 77 or clause 78, in which the modifying step comprises selectively modifying at least the stored history data applicable to the given property of the given data item in response to encoding of the given data item, only when the given data item exceeds a threshold absolute value.

80. The method of any one of clauses 69 to 79, in which the storing step comprises storing history data applicable to a plurality of data item properties.

81. The method of clause 80, in which the data items are image data values, and the history data for a given block of data items containing a given image data value comprises two or more properties selected from the list consisting of:
colour component represented by the given image data value;
block size of a block of data values containing the given image data value;
position of the given image data value in an image;
position of the given image data value in a block of image data values containing the given image data value;
position of a block of image data values containing the given image data value in an image;
position of a sub-block of image data values containing the given image data value within a block of image data values;
block size of a block of image data values containing the given image data value;
distance of the given image data value from a predetermined location in a block of image data values containing the given image data value; and
whether or not the given image data value is generated using a spatial frequency transform.

82. The method of any one of clauses 69 to 81, in which the one or more aspects of decoding the decoded data items comprise one or more aspects indicative of a magnitude of the decoded data items.

83. The method of clause 82, in which the one or more aspects of decoding the decoded data items comprise data dependent upon a second portion size generated to decode the decoded data items.

84. Computer software which, when executed by a computer, causes the computer to perform the method of any one of clauses 69 to 83.

85. A non-transitory machine-readable storage medium which stores the computer software of clause 84.

86. Apparatus for encoding successive blocks of data items, the apparatus comprising:
a history data store configured to store history data for encoded blocks of data items, the history data indicating one or more aspects of encoding the blocks of data items;
generator circuitry configured to generate a block parameter in respect of a given block of data items, the block parameter depending at least in part upon history data applicable to the given block of data items;
first encoder circuitry configured to encode a given data item of the given block of data items by a first encoding technique, the first encoding technique comprising encoding a series of zero or more data sets, each data set representing a respective range of values of the data items and selecting the series of data sets from a plurality of candidate data sets in dependence upon the block parameter generated for the given block of data items; and
second encoder circuitry configured to encode any remaining value of the given data item, the remaining value being an amount by which the given data item exceeds a maximum value which can be encoded by the first encoding technique, by a second encoding technique different to the first encoding technique.

87. Video data capture, transmission, display and/or storage apparatus comprising the apparatus of clause 86.

88. Apparatus for decoding successive blocks of data items, the apparatus comprising:
a history data store configured to store history data for decoded blocks of data items, the history data indicating one or more aspects of decoding the blocks of data items;
generator circuitry configured to generate a block parameter in respect of a given block of data items, the block parameter depending at least in part upon history data applicable to the given block of data items;
first decoder circuitry configured to decode a given data item of the given block of data items by a first decoding technique, the first decoding technique comprising decoding a series of zero or more data sets, each data set representing a respective range of values of the data items and selecting the series of data sets from a plurality of candidate data sets in dependence upon the block parameter generated for the given block of data items; and
second decoder circuitry configured to decode any remaining value of the given data item, the remaining value being an amount by which the given data item exceeds a maximum value which can be decoded by the first decoding technique, by a second encoding technique different to the first decoding technique.

89. Video data capture, transmission, display and/or storage apparatus comprising the apparatus of clause 88.

The invention claimed is:

1. A method of decoding an input data signal representing successive data items, the method comprising:
storing history data for decoded data items, the history data indicating one or more aspects of decoding the decoded data items;
decoding a given data item by a first decoding technique, the first decoding technique comprising decoding a series of zero or more data sets, each data set representing a respective range of values of the data items and selecting the series of data sets from a plurality of candidate data sets in dependence upon (i) a number of previously decoded data sets; and (ii) the history data applicable to a given property of the given data item; and
decoding, by circuitry, any remaining value of the given data item, the remaining value being an amount by which the given data item exceeds a maximum value which can be decoded by the first decoding technique, by a second decoding technique different to the first decoding technique.

2. The method of claim 1, in which the second decoding technique comprises decoding an escape code comprising a first portion and a non-unary coded second portion having a length, in bits, dependent upon a second portion size.

3. The method of claim 2, comprising deriving the second portion size at least in part in dependence upon the history data applicable to the given property of the given data item.

4. The method of claim 3, comprising generating a plurality of candidate second portion sizes and selecting amongst the plurality of candidate second portion sizes in dependence upon the history data applicable to the given property of the given data item.

5. The method of claim 4, in which the generating step comprises, for at least one candidate second portion size, obtaining that candidate second portion size by accessing a look-up table according to an index dependent upon at least one previously encoded data item.

6. The method of claim 5, in which the generating step comprises selectively applying a shift amount dependent upon at least the history data.

7. The method of claim 4, in which the step of generating the plurality of candidate second portion sizes comprises, for at least one candidate second portion size, applying a shift amount dependent upon the value of one or more of the data items.

8. The method of claim 1, in which the candidate data sets comprise one or more data sets selected from the list consisting of:
a significance data set indicating whether a data item is non-zero;
one or more greater-than-n data sets indicating whether a given data item is greater than a respective value of n;
a parity data set indicating a value of a least significant bit of a data item.

9. The method of claim 1, in which the storing step comprises modifying at least the stored history data applicable to the given property of the given data item in response to decoding of the given data item.

10. The method of claim 3, in which the deriving step comprises:
generating a copy of at least portions of the stored history data applicable to the given property of the given data item;
deriving the second portion size at least in part in dependence upon the copy of the history data applicable to the given property of the given data item; and
modifying at least the stored history data applicable to the given property of the given data item in response to encoding of the given data item.

11. The method of claim 9, in which the modifying step comprises selectively modifying at least the stored history data applicable to the given property of the given data item in response to encoding of the given data item, only when the given data item exceeds a threshold absolute value.

12. The method of claim 1, in which the history data comprises data indicative of a plurality of data item properties.

13. The method of claim 1, in which the one or more aspects of decoding the decoded data items comprise one or more aspects indicative of a magnitude of the decoded data items.

14. The method of claim 13, in which the one or more aspects of decoding the decoded data items comprise data dependent upon a second portion size generated to decode the decoded data items.

15. A non-transitory machine-readable storage medium comprising computer code components which when executed by a computer perform the method of claim 1.

16. Apparatus for encoding successive data items, the apparatus comprising:
a history data store configured to store history data for encoded data items, the history data indicating one or more aspects of encoding the encoded data items;
first encoder circuitry configured to encode a given data item by a first encoding technique, the first encoding technique comprising encoding a series of zero or more data sets, each data set representing a respective range of values of the data items and selecting the series of data sets from a plurality of candidate data sets in dependence upon (i) a number of previously encoded data sets; and (ii) the history data applicable to a given property of the given data item; and second encoder circuitry configured to encode any remaining value of the given data item, the remaining value being an amount by which the given data item exceeds a maximum value which can be encoded by the first encoding technique, by a second encoding technique different to the first encoding technique.

17. Apparatus for decoding an input data signal representing successive data items, the apparatus comprising:

a history data store configured to store history data for decoded data items, the history data indicating one or more aspects of decoding the decoded data items;

first decoder circuitry configured to decode a given data item by a first decoding technique, the first decoding technique comprising decoding a series of zero or more data sets, each data set representing a respective range of values of the data items and selecting the series of data sets from a plurality of candidate data sets in dependence upon (i) a number of previously decoded data sets; and (ii) the history data applicable to a given property of the given data item; and second decoder circuitry configured to decode any remaining value of the given data item, the remaining value being an amount by which the given data item exceeds a maximum value which can be decoded by the first decoding technique, by a second decoding technique different to the first decoding technique.

18. Video data capture, transmission, display and/or storage apparatus comprising the apparatus of claim 17.

19. A method of encoding successive data items, the method comprising:

storing history data for encoded data items, the history data indicating one or more aspects of encoding the encoded data items;

encoding a given data item by a first encoding technique, the first encoding technique comprising encoding a series of zero or more data sets, each data set representing a respective range of values of the data items and selecting the series of data sets from a plurality of candidate data sets in dependence upon (i) a number of previously encoded data sets; and (ii) the history data applicable to a given property of the given data item; and encoding, by circuitry, any remaining value of the given data item, the remaining value being an amount by which the given data item exceeds a maximum value which can be encoded by the first encoding technique, by a second encoding technique different to the first encoding technique.

* * * * *